(12) United States Patent
Tian et al.

(10) Patent No.: US 10,708,950 B2
(45) Date of Patent: Jul. 7, 2020

(54) TRANSMISSION OPPORTUNITY SHARING FOR AUTONOMOUS UPLINK

(71) Applicant: QUALCOMM Incorporated, San Diego, CA (US)

(72) Inventors: Qingjiang Tian, San Diego, CA (US); Jing Sun, San Diego, CA (US); Xiaoxia Zhang, San Diego, CA (US); Srinivas Yerramalli, San Diego, CA (US); Tamer Kadous, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 34 days.

(21) Appl. No.: 16/203,073

(22) Filed: Nov. 28, 2018

(65) Prior Publication Data
US 2019/0223215 A1    Jul. 18, 2019

Related U.S. Application Data

(60) Provisional application No. 62/617,896, filed on Jan. 16, 2018.

(51) Int. Cl.
*H04W 16/14*  (2009.01)
*H04W 72/04*  (2009.01)
(Continued)

(52) U.S. Cl.
CPC .......... *H04W 74/0808* (2013.01); *H04L 1/00* (2013.01); *H04L 1/0003* (2013.01); *H04L 5/00* (2013.01);
(Continued)

(58) Field of Classification Search
None
See application file for complete search history.

(56) References Cited

U.S. PATENT DOCUMENTS

2017/0048889 A1* 2/2017 Kadous ............ H04W 74/0816
2017/0311343 A1* 10/2017 Chendamarai Kannan ................
H04L 5/0055
(Continued)

OTHER PUBLICATIONS

Hiertz G.R., et al., "The Evolution of Wireless LANs and PANs—Analysis of IEEE 802.11 E for qos Support in Wireless LANs," IEEE Personal Communications, IEEE Communications Society, US, vol. 10 (6), Dec. 1, 2003, pp. 40-50, XP011107079, ISSN: 1070-9916, DOI: 10.1109/MWC.2003.1265851.
(Continued)

*Primary Examiner* — Duc T Duong
(74) *Attorney, Agent, or Firm* — Liem T. Do

(57) ABSTRACT

Methods, systems, and devices for wireless communications are described. A user equipment (UE) may obtain access to a shared radio frequency spectrum band for a transmission opportunity. The UE may perform an autonomous uplink transmission over the shared radio frequency spectrum band during a first portion of the transmission opportunity. The UE may transmit a physical layer scheduling request comprising a transmission size parameter for a second portion of the transmission opportunity. The UE may receive an uplink grant for the second portion of the transmission opportunity based at least in part on the scheduling request. The UE may perform a scheduled uplink transmission over the shared radio frequency spectrum band during the second portion of the transmission opportunity according to the uplink grant.

30 Claims, 16 Drawing Sheets

(51) Int. Cl.
*H04W 72/14* (2009.01)
*H04W 74/04* (2009.01)
*H04W 74/08* (2009.01)
*H04L 1/00* (2006.01)
*H04L 5/00* (2006.01)
*H04W 72/12* (2009.01)

(52) U.S. Cl.
CPC ......... *H04W 16/14* (2013.01); *H04W 72/042* (2013.01); *H04W 72/0446* (2013.01); *H04W 72/0453* (2013.01); *H04W 72/14* (2013.01); *H04W 72/1284* (2013.01); *H04W 74/0816* (2013.01)

(56) References Cited

U.S. PATENT DOCUMENTS

| | | | | |
|---|---|---|---|---|
| 2018/0132235 | A1* | 5/2018 | Hosseini | H04L 27/0006 |
| 2018/0139777 | A1* | 5/2018 | Yoo | H04W 74/004 |
| 2018/0206127 | A1* | 7/2018 | Zhang | H04W 72/10 |
| 2018/0227944 | A1* | 8/2018 | Yerramalli | H04L 1/08 |
| 2019/0014481 | A1* | 1/2019 | Yerramalli | H04L 5/0044 |
| 2019/0150088 | A1* | 5/2019 | Sun | H04W 52/0229 455/574 |
| 2019/0150184 | A1* | 5/2019 | Golitschek Edler von Elbwart | H04W 72/14 |
| 2019/0268912 | A1* | 8/2019 | Myung | H04L 5/0055 |
| 2019/0280831 | A1* | 9/2019 | Chu | H04L 5/005 |

OTHER PUBLICATIONS

International Search Report and Written Opinion—PCT/US2018/063049—ISA/EPO—dated Feb. 11, 2019.
LG Electronics: "HARQ Operation for Autonomous UL Access," 3GPP Draft; R1-1719864 LAA HARQ_FINAL, 3rd Generation Partnership Project (3GPP), Mobile Competence Centre; 650, Route Des Lucioles; F-06921 Sophia-Antipolis Cedex; France, vol. RAN WG1, No. Reno, USA; Nov. 27, 2017-Dec. 1, 2017, Nov. 18, 2017, XP051369578, 4 pages, Retrieved from the Internet: URL: http://www.3gpp.org/ftp/tsg%5Fran/WG1%5FRL1/TSGR1%5F91/Docs/ [retrieved on Nov. 18, 2017].
Qualcomm Incorporated: "Simultaneous Scheduling Request and Data Transmission for Uplink URLLC," 3GPP Draft; R1-1700828, 3rd Generation Partnership Project (3GPP), Mobile Competence Centre; 650, Route Des Lucioles; F-06921 Sophia-Antipolis Cedex; France, vol. RAN WG1, No. Spokane, Wa; Jan. 16, 2017-Jan. 20, 2017, Jan. 16, 2017, XP051208347, 8 pages, Retrieved from the Internet: URL: http://www.3gpp.org/ftp/Meetings_3GPP_SYNC/RAN1/Docs/ [retrieved on Jan. 16, 2017].

* cited by examiner

TRANSMISSION OPPORTUNITY SHARING FOR AUTONOMOUS UPLINK

CROSS REFERENCE

The present Application for Patent claims the benefit of U.S. Provisional Patent Application No. 62/617,896 by TIAN, et al., entitled "TRANSMISSION OPPORTUNITY SHARING FOR AUTONOMOUS UPLINK," filed Jan. 16, 2018, assigned to the assignee hereof, and expressly incorporated herein by reference in its entirety.

BACKGROUND

The following relates generally to wireless communication, and more specifically to transmission opportunity sharing for autonomous uplink (AUL).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

Certain wireless communications systems may operate in a shared or unlicensed radio frequency spectrum band. For example, wireless devices may perform a channel access procedure, such as a clear channel assessment (CCA) procedure, a listen-before-talk (LBT) procedure, and the like. The channel access procedure may allow the wireless device to capture the channel for a transmission opportunity, such as a maximum channel occupancy time (MCOT), a Wi-Fi transmission opportunity (TXOP), and the like. In some instances, the wireless device may share a portion of the transmission opportunity. For example, a UE may capture the shared channel for a transmission opportunity to be used for AUL. In some cases, captured transmission opportunities are underutilized, resulting in wasted transmission resources and inefficient use of the channel.

SUMMARY

The described techniques relate to improved methods, systems, devices, or apparatuses that support transmission opportunity sharing for autonomous uplink (AUL) transmissions. Generally, the described techniques provide for a UE to provide an indication that a transmission opportunity is available for sharing for a scheduled uplink transmission (SUL) from the UE. For example, the UE may be operating in, and obtain access to, a shared or unlicensed radio frequency spectrum band for an AUL transmission. The transmission opportunity may be a maximum channel occupancy time (MCOT) transmission opportunity, a Wi-Fi transmission opportunity, and the like. The UE may determine that a portion of the transmission opportunity is available for sharing, e.g., to be used for a SUL. Accordingly, the UE may perform the AUL transmission during a first portion of the transmission opportunity and transmit a physical layer scheduling request to the base station. Generally the scheduling request may include information associated with or otherwise indicative of how much data the UE may wish to communicate in the SUL, how long the SUL transmission may take, and the like. In one example, the UE may transmit a short buffer status report, or information indicative thereof, in the scheduling request. In some aspects, the UE may determine whether to share the transmission opportunity based on various delays, such as UE and/or base station related delays. The base station may receive the scheduling request and respond by transmitting uplink grant that provides an indication of resources to be used for the SUL during the second portion of the transmission opportunity. The UE may perform the SUL transmission during the second portion of the transmission opportunity according to the uplink grant.

A method of wireless communication is described. The method may include obtaining access to a shared radio frequency spectrum band for a transmission opportunity, performing an AUL transmission over the shared radio frequency spectrum band during a first portion of the transmission opportunity, transmitting a physical layer scheduling request including a transmission size parameter for a second portion of the transmission opportunity, receiving an uplink grant for the second portion of the transmission opportunity based at least in part on the scheduling request, and performing an SUL transmission over the shared radio frequency spectrum band during the second portion of the transmission opportunity according to the uplink grant.

An apparatus for wireless communication is described. The apparatus may include means for obtaining access to a shared radio frequency spectrum band for a transmission opportunity, means for performing an AUL transmission over the shared radio frequency spectrum band during a first portion of the transmission opportunity, means for transmitting a physical layer scheduling request including a transmission size parameter for a second portion of the transmission opportunity, means for receiving an uplink grant for the second portion of the transmission opportunity based at least in part on the scheduling request, and means for performing an SUL transmission over the shared radio frequency spectrum band during the second portion of the transmission opportunity according to the uplink grant.

Another apparatus for wireless communication is described. The apparatus may include a processor, memory in electronic communication with the processor, and instructions stored in the memory. The instructions may be operable to cause the processor to obtain access to a shared radio frequency spectrum band for a transmission opportunity, perform an AUL transmission over the shared radio frequency spectrum band during a first portion of the transmission opportunity, transmit a physical layer scheduling request including a transmission size parameter for a second portion of the transmission opportunity, receive an uplink grant for the second portion of the transmission opportunity based at least in part on the scheduling request, and perform an SUL transmission over the shared radio frequency spectrum band during the second portion of the transmission opportunity according to the uplink grant.

A non-transitory computer-readable medium for wireless communication is described. The non-transitory computer-readable medium may include instructions operable to cause a processor to obtain access to a shared radio frequency spectrum band for a transmission opportunity, perform an AUL transmission over the shared radio frequency spectrum band during a first portion of the transmission opportunity, transmit a physical layer scheduling request including a transmission size parameter for a second portion of the transmission opportunity, receive an uplink grant for the second portion of the transmission opportunity based at least in part on the scheduling request, and perform an SUL transmission over the shared radio frequency spectrum band during the second portion of the transmission opportunity according to the uplink grant.

Some examples of the method, apparatus, and non-transitory computer-readable medium described above may further include processes, features, means, or instructions for selecting the transmission size parameter based at least in part on one or more of a buffer size, or a resource block count for the SUL transmission, or a modulation and coding scheme (MCS) for the SUL transmission.

Some examples of the method, apparatus, and non-transitory computer-readable medium described above may further include processes, features, means, or instructions for determining to transmit the scheduling request based at least in part on a size of the second portion of the transmission opportunity and one or more of a scheduling request processing delay, or a UE encoding delay, or an uplink grant transmission time.

Some examples of the method, apparatus, and non-transitory computer-readable medium described above may further include processes, features, means, or instructions for determining that a data buffer cannot be emptied using the AUL transmission during the first portion of the transmission opportunity. Some examples of the method, apparatus, and non-transitory computer-readable medium described above may further include processes, features, means, or instructions for transmitting the scheduling request may be based at least in part on the determining.

Some examples of the method, apparatus, and non-transitory computer-readable medium described above may further include processes, features, means, or instructions for selecting an ending symbol for the AUL transmission based at least in part on the scheduling request.

Some examples of the method, apparatus, and non-transitory computer-readable medium described above may further include processes, features, means, or instructions for determining that no scheduling request may be to be transmitted during the transmission opportunity. Some examples of the method, apparatus, and non-transitory computer-readable medium described above may further include processes, features, means, or instructions for selecting a last available symbol as the ending symbol based at least in part on the determining.

Some examples of the method, apparatus, and non-transitory computer-readable medium described above may further include processes, features, means, or instructions for determining that the scheduling request may be to be transmitted during the transmission opportunity. Some examples of the method, apparatus, and non-transitory computer-readable medium described above may further include processes, features, means, or instructions for selecting an intermediate available symbol as the ending symbol based at least in part on the determining.

Some examples of the method, apparatus, and non-transitory computer-readable medium described above may further include processes, features, means, or instructions for transmitting an indication of the ending symbol selection with the scheduling request.

Some examples of the method, apparatus, and non-transitory computer-readable medium described above may further include processes, features, means, or instructions for selecting a transport block size for the AUL transmission based at least in part on the selected ending symbol of the AUL transmission.

Some examples of the method, apparatus, and non-transitory computer-readable medium described above may further include processes, features, means, or instructions for identifying a first subframe of the transmission opportunity associated with an expected receipt of the uplink grant by the UE. Some examples of the method, apparatus, and non-transitory computer-readable medium described above may further include processes, features, means, or instructions for selecting an ending symbol for a second subframe preceding the first subframe based at least in part on the identifying.

Some examples of the method, apparatus, and non-transitory computer-readable medium described above may further include processes, features, means, or instructions for transmitting the scheduling request in a request-to-send (RTS) frame. Some examples of the method, apparatus, and non-transitory computer-readable medium described above may further include processes, features, means, or instructions for receiving the uplink grant in a clear-to-send (CTS) frame.

In some examples of the method, apparatus, and non-transitory computer-readable medium described above, at least a portion of the AUL transmission may include the RTS frame.

In some examples of the method, apparatus, and non-transitory computer-readable medium described above, the RTS frame may be transmitted when channel access may be obtained.

In some examples of the method, apparatus, and non-transitory computer-readable medium described above, the RTS frame may include a floating RTS frame in that the RTS frame may be not aligned with respect to a subframe boundary.

Some examples of the method, apparatus, and non-transitory computer-readable medium described above may further include processes, features, means, or instructions for performing the SUL transmission during a data frame occurring after the CTS frame.

In some examples of the method, apparatus, and non-transitory computer-readable medium described above, the transmission opportunity may include at least one of a maximum channel occupancy time or a Wi-Fi TXOP.

In some examples of the method, apparatus, and non-transitory computer-readable medium described above, the transmission size parameter may include a short buffer status report.

In some examples of the method, apparatus, and non-transitory computer-readable medium described above, a transport block size used for the AUL transmission may be different from the transport block size used for the SUL transmission.

A method of wireless communication is described. The method may include receiving an AUL transmission over a shared radio frequency spectrum band during a first portion of a transmission opportunity, receiving a physical layer scheduling request including a transmission size parameter for a second portion of the transmission opportunity, transmitting an uplink grant for the second portion of the transmission opportunity based at least in part on the scheduling request, and receiving an SUL transmission over the shared radio frequency spectrum during the second portion of the transmission opportunity according to the uplink grant.

An apparatus for wireless communication is described. The apparatus may include means for receiving an AUL transmission over a shared radio frequency spectrum band during a first portion of a transmission opportunity, means for receiving a physical layer scheduling request including a transmission size parameter for a second portion of the transmission opportunity, means for transmitting an uplink grant for the second portion of the transmission opportunity based at least in part on the scheduling request, and means for receiving an SUL transmission over the shared radio frequency spectrum during the second portion of the transmission opportunity according to the uplink grant.

Another apparatus for wireless communication is described. The apparatus may include a processor, memory in electronic communication with the processor, and instructions stored in the memory. The instructions may be operable to cause the processor to receive an AUL transmission over a shared radio frequency spectrum band during a first portion of a transmission opportunity, receive a physical layer scheduling request including a transmission size parameter for a second portion of the transmission opportunity, transmit an uplink grant for the second portion of the transmission opportunity based at least in part on the scheduling request, and receive an SUL transmission over the shared radio frequency spectrum during the second portion of the transmission opportunity according to the uplink grant.

A non-transitory computer-readable medium for wireless communication is described. The non-transitory computer-readable medium may include instructions operable to cause a processor to receive an AUL transmission over a shared radio frequency spectrum band during a first portion of a transmission opportunity, receive a physical layer scheduling request including a transmission size parameter for a second portion of the transmission opportunity, transmit an uplink grant for the second portion of the transmission opportunity based at least in part on the scheduling request, and receive an SUL transmission over the shared radio frequency spectrum during the second portion of the transmission opportunity according to the uplink grant.

Some examples of the method, apparatus, and non-transitory computer-readable medium described above may further include processes, features, means, or instructions for identifying a communication parameter associated with the SUL transmission. Some examples of the method, apparatus, and non-transitory computer-readable medium described above may further include processes, features, means, or instructions for determining a time duration for the second portion of the transmission opportunity based at least in part on the transmission size parameter and the communication parameter.

In some examples of the method, apparatus, and non-transitory computer-readable medium described above, the communication parameter may include one or more of a modulation and coding scheme parameter, or a transport block size parameter, or a channel performance parameter, or a combination thereof.

Some examples of the method, apparatus, and non-transitory computer-readable medium described above may further include processes, features, means, or instructions for determining to transmit the uplink grant based at least in part on a size of the second portion of the transmission opportunity and one or more of: an uplink grant processing delay or a UE encoding delay.

Some examples of the method, apparatus, and non-transitory computer-readable medium described above may further include processes, features, means, or instructions for receiving a signal indicating an ending symbol selection for the AUL transmission, the signal being received with the scheduling request.

Some examples of the method, apparatus, and non-transitory computer-readable medium described above may further include processes, features, means, or instructions for receiving the scheduling request in an RTS frame. Some examples of the method, apparatus, and non-transitory computer-readable medium described above may further include processes, features, means, or instructions for transmitting the uplink grant in a CTS frame.

In some examples of the method, apparatus, and non-transitory computer-readable medium described above, at least a portion of the AUL transmission may include the RTS frame.

In some examples of the method, apparatus, and non-transitory computer-readable medium described above, the RTS frame may include a floating RTS frame in that the RTS frame may be not aligned with respect to a subframe boundary.

Some examples of the method, apparatus, and non-transitory computer-readable medium described above may further include processes, features, means, or instructions for receiving the SUL transmission during a data frame occurring after the CTS frame.

In some examples of the method, apparatus, and non-transitory computer-readable medium described above, the transmission opportunity may include at least one of a maximum channel occupancy time transmission opportunity or a Wi-Fi transmission opportunity.

In some examples of the method, apparatus, and non-transitory computer-readable medium described above, the transmission size parameter includes a short buffer status report.

In some examples of the method, apparatus, and non-transitory computer-readable medium described above, a transport block size used for the AUL transmission may be different from the transport block size used for the SUL transmission.

DETAILED DESCRIPTION

Figure 1:
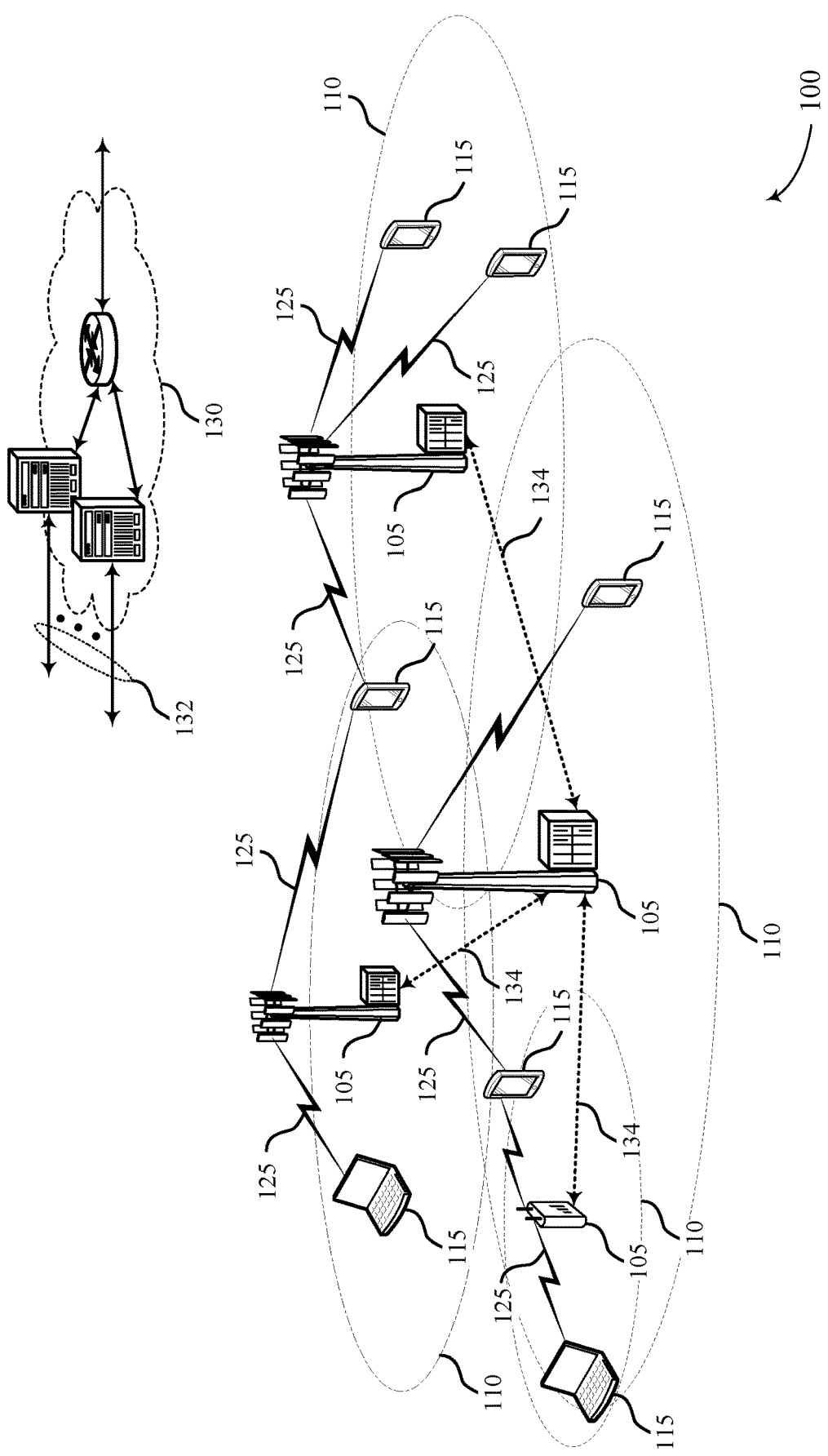
FIG. 1 illustrates an example of a system for wireless communication that supports transmission opportunity sharing for AUL in accordance with aspects of the present disclosure.

Certain wireless communications systems may support sharing of a transmission opportunity on a channel, such as a channel of a shared or unlicensed radio frequency spectrum band. For example, a user equipment (UE) may capture the channel for the transmission opportunity for an autonomous uplink (AUL) transmission. The UE may determine that a portion of the transmission opportunity is available for sharing. Accordingly, the UE may transmit an indication to the base station of the remaining portion of the transmission opportunity that is available to be shared. In one example, the UE may simply indicate the portion of the transmission opportunity to be shared and the base station may share that portion for uplink and/or downlink communications with other UEs. In a second example where the UE is sharing the remaining portion for a scheduled uplink (SUL) transmission, the UE may also transmit a scheduling request in the sharing indication. Conventional scheduling requests are typically conveyed as a single bit in the uplink control indicator (UCI) associated with an uplink transmission. However, these conventional one-bit scheduling requests do not enable the UE and base station to adopt a more considered approach when sharing the transmission opportunity with an SUL transmission. For example, current configurations do not support an indication of an amount of data that the UE needs to communicate during the shared portion of the transmission opportunity. This may result in waste and/or inefficient use of the shared resources.

Aspects of the disclosure are initially described in the context of a wireless communications system. Generally, aspects of the described techniques provide for a special scheduling request to be transmitted at the physical layer to allow transmission opportunity sharing between an AUL transmission and an SUL transmission by a UE. For example, when the UE has SUL data to send in transmission opportunity used for an AUL transmission, the UE may transmit a transmission size parameter (e.g., such as a buffer size indication) in the physical layer scheduling request during the AUL. The UE may perform the AUL transmission, including the scheduling request, during a first portion of the transmission opportunity. The physical layer scheduling request may include the transmission size parameter for a second portion of the transmission opportunity that is to be shared for the SUL transmission. The base station may receive the scheduling request and provide an uplink grant for the second portion of the transmission opportunity. The UE may perform the SUL on the shared channel during the second portion of the transmission opportunity based on the uplink grant.

Additionally or alternatively, the UE may dynamically select the ending symbol for the AUL transmission based on whether the UE intends to share the transmission opportunity with an SUL transmission. For example, when the UE determines that the second portion is not to be shared for the SUL transmission, the UE may select the last symbol of the AUL subframe as an ending symbol for the AUL transmission. In another example, when the UE determines that the second portion is to be shared with an SUL transmission, the UE may select an intermediate symbol, e.g., the 10th symbol, the 11th symbol, or some other symbol of the AUL subframe, as the ending symbol for the AUL transmission. In some examples, the UE may provide an indication to the base station of which symbol has been selected as the ending symbol for the AUL transmission, e.g., an indication in the physical layer scheduling request.

Aspects of the disclosure are further illustrated by and described with reference to apparatus diagrams, system diagrams, and flowcharts that relate to transmission opportunity sharing for AUL.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation (CA) configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

A UE 115 may obtain access to a shared radio frequency spectrum band for a transmission opportunity. The UE 115 may perform an AUL transmission over the shared radio frequency spectrum band during a first portion of the transmission opportunity. The UE 115 may transmit a physical layer scheduling request including a transmission size parameter for a second portion of the transmission opportunity. The UE 115 may receive an uplink grant for the second portion of the transmission opportunity based at least in part on the scheduling request. The UE 115 may perform an SUL transmission over the shared radio frequency spectrum band during the second portion of the transmission opportunity according to the uplink grant.

A base station 105 may receive an AUL transmission over a shared radio frequency spectrum band during a first portion of a transmission opportunity. The base station 105 may receive a physical layer scheduling request including a transmission size parameter for a second portion of the transmission opportunity. The base station 105 may transmit an uplink grant for the second portion of the transmission opportunity based at least in part on the scheduling request. The base station 105 may receive an SUL transmission over the shared radio frequency spectrum during the second portion of the transmission opportunity according to the uplink grant.

Figure 2:
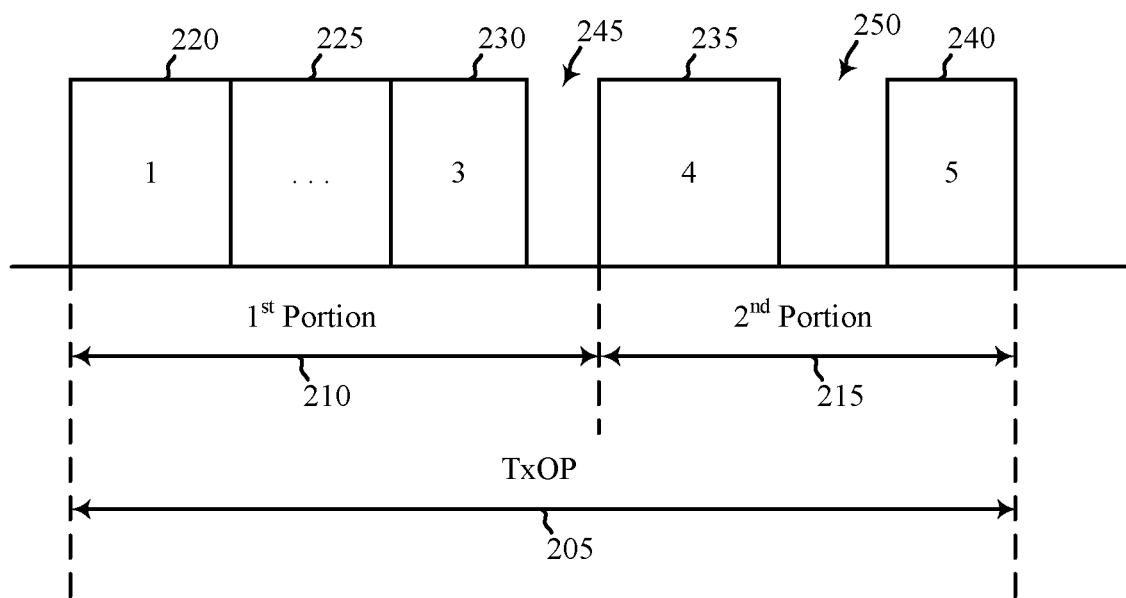
FIG. 2 illustrates an example of a timing diagram that supports transmission opportunity sharing for AUL in accordance with aspects of the present disclosure.

FIG. 2 illustrates an example of a timing diagram 200 that supports transmission opportunity sharing for AUL in accordance with various aspects of the present disclosure. In some examples, timing diagram 200 may implement aspects of wireless communications system 100. Aspects of timing diagram 200 may be implemented by the UE 115 and/or a base station 105, which may be examples of the corresponding devices described herein.

Timing diagram 200 may include a transmission opportunity 205, such as an MCOT transmission opportunity, a Wi-Fi transmission opportunity, and the like. Generally, the transmission opportunity 205 may refer to any time period that a wireless device obtains access to a shared radio frequency spectrum band, e.g., such as an unlicensed band. For example, the wireless device may perform a channel access procedure, such as a clear channel assessment (CCA) procedure, or an LBT procedure, and the like, to capture the shared channel for the time period. And one non-limiting example, the wireless device may perform a category 4 LBT procedure to obtain access to the shared channel for the transmission opportunity.

The transmission opportunity 205 may be divided into a first portion 210 and a second portion 215. Generally, the first portion 210 may be associated with an AUL transmission portion of the transmission opportunity 205 and the second portion 215 may be associated with an SUL transmission portion of the transmission opportunity 205. Each portion may include one or more subframes. In the example timing diagram 200, the first portion 210 is shown having three subframes (illustrated as subframes 220, 225, and 230) and the second portion is shown having two subframes (illustrated as subframes 235 and 240). However, it is to be understood that the first portion 210 and/or the second portion 215 may have more or fewer subframes. In some aspects, the number of subframes in each portion may depend on such factors as the duration of the transmission opportunity 205, the amount of information to be communicated during the AUL transmission and/or the SUL transmission, and the like.

In some aspects, a UE 115 may obtain access to a shared channel for the transmission opportunity 205 and perform an AUL transmission over the shared channel during the first portion 210. The UE 115 may transmit a physical layer scheduling request during the first portion 210 (e.g., during subframe 220) to the base station that identifies otherwise provides an indication of a transmission size parameter for an SUL transmission during the second portion 215. The transmission size parameter may be transmitted in a uplink control indicator (UCI) during subframe 220 and may include or otherwise identify an amount of data to be transmitted during the SUL transmission, e.g., such as a buffer status report. In one non-limiting example, the transmission size parameter may use a short buffer status report format. The UE 115 may continue to perform the AUL transmission during the first portion 210, e.g., during subframes 225 and 230.

In some aspects, the UE 115 may consider one or more parameters when selecting the transmission size parameter to indicate in the scheduling request. Examples of such parameters may include, but are not limited to, a buffer size, the number resource blocks that will be utilized during SUL transmission, the modulation and coding scheme (MCS) to be used for the SUL transmission, a timing parameter associated with the SUL transmission, and the like. Accordingly, the transmission size parameter may provide sufficient information for the base station to identify and allocate resources for the SUL transmission.

In some aspects, the UE 115 may transmit the scheduling request based on a determination of whether or not the UE 115 is able to communicate all of its data during the AUL transmission and/or the SUL transmission. For example, the UE 115 may determine whether a buffer storing data to be communicated can be emptied during the AUL transmission (e.g., during the first portion 210). If the UE 115 determines that the data buffer cannot be emptied, the UE 115 may transmit the scheduling request for the SUL transmission in response.

In some aspects, the UE 115 may transmit the scheduling request based on a determination of whether or not there is a threshold amount of time and/or resources available for the SUL transmission. For example, the UE 115 may determine the size of the second portion 215 and then consider such variables as a processing delay associated with the UE 115 configuring and transmitting the scheduling request, a transmission time delay associated with the base station 105 receiving the scheduling request and responding with an uplink grant, a UE encoding delay for the UE 115 to receive and process the SUL transmission during the second portion 215, and the like. One example of a UE encoding delay is illustrated in timing diagram 200 as gap period 250 between subframes 235 and 240 of the second portion 215. The UE 115 may transmit the scheduling request when the available amount of time and/or other resources for the SUL transmission satisfy the threshold amount.

In some aspects, the base station may receive the physical layer scheduling request and respond by transmitting an uplink grant for the second portion 215. The uplink grant may identify or otherwise provide an indication of uplink resources to be used for the SUL transmission during the second portion 215.

In some aspects, the base station may transmit the uplink grant after consideration of various delay parameters, communication parameters, and the like. For example, the base station may consider the MCS for the SUL transmission, the transport block size for the SUL transmission, various channel performance metrics, and the like. The base station may consider the size of the second portion 215 (e.g., such as the number of subframes in the second portion 215) in relation to the communication parameters, the delays, the amount of data to be communicated in the SUL transmission, and the like. Accordingly, the base station may determine to transmit the uplink grant based on such considerations. In some aspects, the transport block size used for the AUL transmission may be the same as, or different than, the transport block size used for the SUL transmission.

The base station 105 may transmit (and the UE 115 may receive) the uplink grant and perform the SUL reception during the second portion 215 according to the uplink grant. In one example, the base station 105 may provide the uplink grant during subframe 235 and the UE 115 may perform the SUL transmission during the second portion 215 (e.g. during subframe 240).

In addition to and/or in lieu of any of the above-described techniques, the UE 115 may dynamically select an ending symbol for the AUL transmission. That is, conventional techniques provide for the same ending symbol to be used in the AUL transmission. However, in accordance with aspects of the described techniques the UE 115 may select any symbol to use as the ending symbol for the AUL transmission. As one example where there is no scheduling request transmitted during the transmission opportunity 205, the UE 115 may use the last available symbol as the ending symbol, e.g., symbol 13, symbol 14, etc., depending on the slot configuration of the subframe. As another example whether there is a scheduling request transmitted during the transmission opportunity 205, the UE 115 may select any of the intermediate symbols as the ending symbol for the AUL transmission. In some aspects, the UE 115 may consider the amount of data being communicated in and/or the transport block size of the AUL transmission when selecting the ending symbol. This is illustrated in timing diagram 200 by a gap period 245 shown between the last subframe of the AUL transmission (e.g., subframe 230) and the first subframe of the second portion 215 may (e.g., subframe 235). In some examples, the UE 115 may transmit an indication of the selected ending symbol to the base station, e.g., in the scheduling request.

Thus, certain aspects may provide for the UE 115 to include in the UCI for the AUL transmission a scheduling request at the physical layer. In some aspects, the scheduling request as an MAC-CE may also be supported. The physical layer scheduling request may have improved resolution on the uplink buffer status than current scheduling request format to assist the base station in transmission opportunity sharing. The base station may determine if a follow-up SUL is needed, and how long the SUL portion is needed. The additional bits in the scheduling request may be helpful to allow the base station to know how many slots to schedule for the SUL transmission. The scheduling request information used together with channel estimation (e.g., MCS determination) may allow the base station to determine how long in the shared transmission opportunity 205 the UE 115 should be scheduled. The physical layer scheduling request may carry or otherwise convey a buffer status report (BSR) indication of the number of bytes in the buffer (aggregated or for each priority class), quantized, or an indication of the SUL resources needed (some default MCS and resource allocation assumed) in terms of the number of resource blocks needed.

In some aspects when the UE 115 determines to use an SUL within the transmission opportunity 205, the UE 115 may consider a special scheduling request processing delay by the base station 105 and the remaining data to be communicated in the SUL transmission. The UE 115 may not require an SUL transmission if the AUL transmission can be used to transmit all the data before the uplink grant from the base station 105. When the base station 105 receives the special scheduling request within the transmission opportunity 205, the base station 105 may consider its own processing delay, together with remaining AUL subframe. The base station 105 may withhold the uplink grant when the UE 115 can complete transmitting all of its data before receiving grant.

In some aspects where the UE 115 determines to use SUL, the subframe before the subframe that the UE 115 expects to receive the uplink grant may end at symbol 12 or earlier (e.g., to allow the base station to perform LBT). In some aspects, the SUL transmission may use a different MCS than the AUL transmission.

In some aspects, the ending symbol may depend on if the UE 115 determines to share the transmission opportunity 205 (e.g., when the UE 115 expects to receive an uplink grant from the base station). When the UE 115 determines to share the transmission opportunity 205 for an SUL transmission, the UE 115 may end the AUL transmission at symbol 12 (e.g., to leave a symbol gap for base station 105 to perform a category 2 LBT to send the SUL grants). The UCI may be sent in the beginning of the AUL portion, so the SUL grants can be prepared ahead of time. If the UE 115 determines not to share the transmission opportunity 205 for the SUL transmission, the UE 115 may end the AUL transmission at symbol 13 (e.g., the last symbol). The ending position of the AUL transmission can be indicated in the UCI (e.g., the indication may share the scheduling request field). The scheduling request field may double as SUL trigger and ending symbol indicator. This may also be indicated by the available MCOT field. In the situation where there is no data in the buffer, the UE 115 may set MCOT to share field as 0. The transport block size can change depending on the ending symbol location. If the remaining data in the UE buffer can be conveyed in symbol 13, and the UE 115 may choose symbol 13 as the ending symbol.

Figure 3:
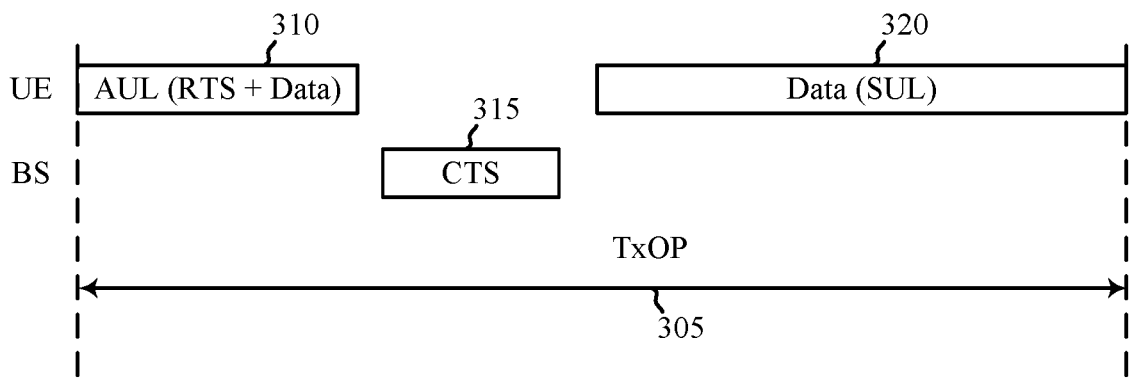
FIG. 3 illustrates an example of a timing diagram that supports transmission opportunity sharing for AUL in accordance with aspects of the present disclosure.

FIG. 3 illustrates an example of a timing diagram 300 that supports transmission opportunity sharing for AUL in accordance with various aspects of the present disclosure. In some examples, timing diagram 300 may implement aspects of wireless communications system 100 and/or timing diagram 200. Aspects of timing diagram 300 may be implemented by UE 115 and/or base station 105, which may be examples of the corresponding devices described herein. Broadly, timing diagram 300 illustrates one example where a shared transmission opportunity corresponds to a Wi-Fi transmission opportunity.

Generally, timing diagram 300 extends the described techniques for transmission opportunity sharing to a Wi-Fi framework. Timing diagram 300 may include a transmission opportunity 305. Generally, the transmission opportunity 305 may refer to any time period that a wireless device obtains access to a shared radio frequency spectrum band, e.g., such as an unlicensed band. For example, the wireless device may perform a channel access procedure, such as a CCA procedure, or an LBT procedure, and the like, to capture the shared channel for the time period.

The transmission opportunity 305 may include an AUL transmission 310, a clear-to-send (CTS) frame 315, and a data frame 320 that includes the SUL transmission. The AUL transmission 310 may include a request-to-send (RTS) frame in combination with AUL transmission data. A UE 115 may transmit the scheduling request in the RTS frame and receive the uplink grant in the CTS frame 315. For example, the RTS frame may include or otherwise provide an indication of a buffer status report of the UE 115. In some aspects, some or all of the AUL transmission may be performed AUL transmission 310. The RTS frame may be transmitted once the UE 115 obtains access to the shared channel. The RTS frame may be a floating RTS frame, e.g., the RTS frame may not be aligned with respect to a subframe boundary.

The base station 105 may transmit the CTS frame 315 in response to the RTS frame 310. The CTS frame 315 may carry or otherwise convey an indication of the uplink grant, e.g., resources to be used for the SUL transmission. The UE 115 and the base station 105 may perform the SUL transmission during the data frame 320. In some aspects, the CTS frame 315 may communicated during the second portion of the transmission opportunity 305.

Thus, the sharing of AUL and SUL on the same transmission opportunity for the same UE 115 can be extended to an RTS/CTS framework. The UE 115 may send the RTS frame to the base station 105 in the AUL transmission 310. The RTS frame may include a scheduling request (e.g., a buffer status report) from the UE 115. The AUL transmission may also include data from the UE 115, e.g., some or all of the AUL data. In one example, the RTS frame may be sent on the pre-assigned resources in time and frequency as in AUL. In another example, the RTS frame may be sent asynchronously from the UE 115 whenever the UE 115 wants to transmit and gains the medium access as in Wi-Fi. The base station 105 may send the CTS frame 315 to the UE 115. The CTS frame 315 may include the scheduling command and, in some examples, may also include some downlink broadcast signal such as synchronization signal blocks (SSBs), channel state information reference signal (CSI-RS), etc. The base station 105 may send the uplink grant based on UE scheduling request/buffer status report as well as the uplink link quality and the interference level experienced by the base station 105. In some aspects, the SUL may yield better link efficiency compared to AUL. The UE 115 may send the SUL data according to the uplink grant.

Figure 4:
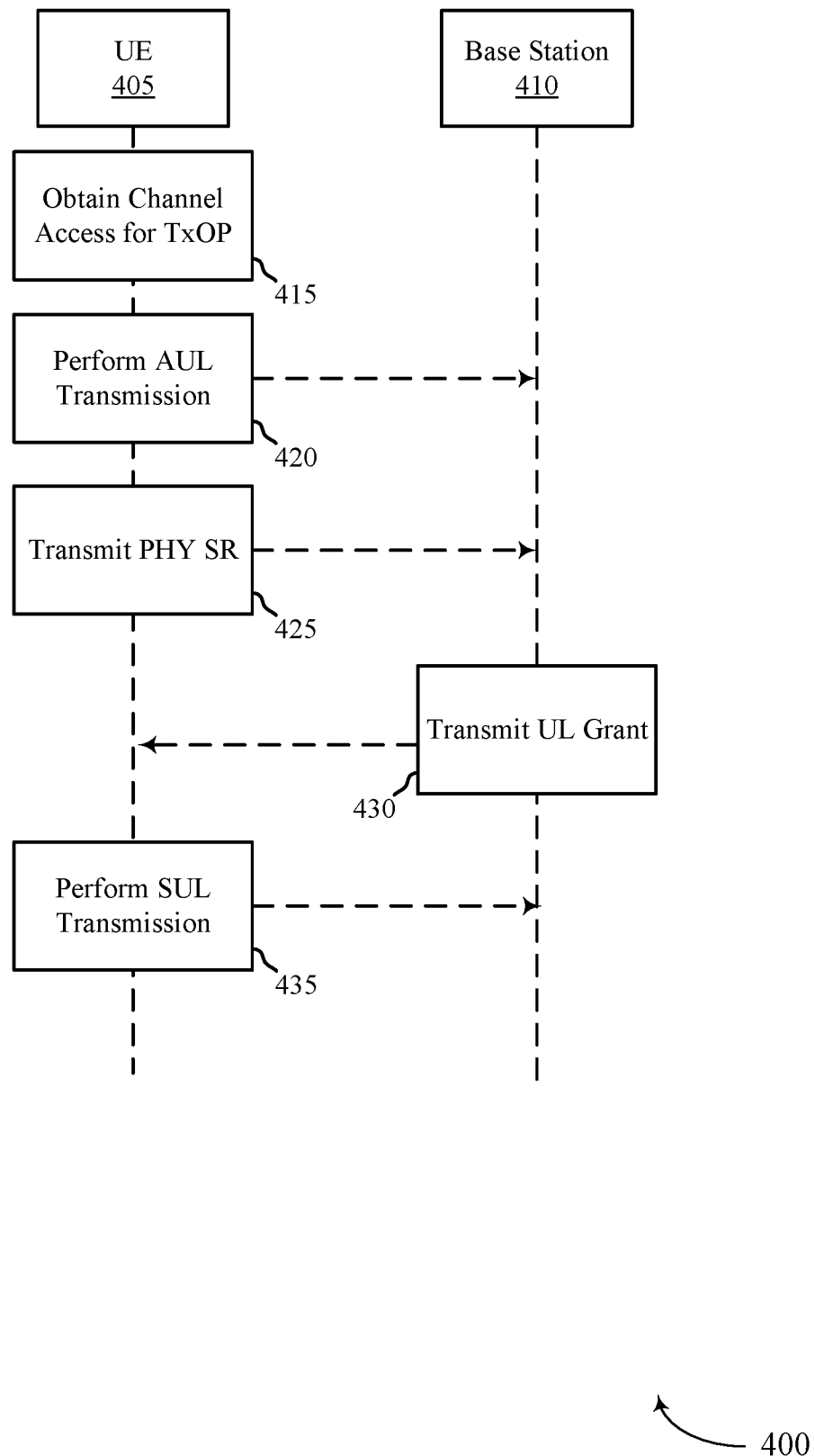
FIG. 4 illustrates an example of a process that supports transmission opportunity sharing for AUL in accordance with aspects of the present disclosure.

FIG. 4 illustrates an example of a process 400 that supports transmission opportunity sharing for AUL in accordance with various aspects of the present disclosure. In some examples, process 400 may implement aspects of wireless communications system 100 and/or timing diagrams 200 and 300. Process 400 may be implemented by a UE 405 and the base station 410, which may be examples of the corresponding devices described herein.

At 415, UE 405 may obtain access to a shared radio frequency spectrum band for a transmission opportunity. In some aspects, UE 405 may perform LBT procedure to capture or otherwise obtain access to the shared channel. In some aspects, the transmission opportunity may be an MCOT, a Wi-Fi transmission opportunity, and the like.

At 420, UE 405 may transmit (and base station 410 may receive) an AUL transmission over the shared radio frequency spectrum band during a first portion of the transmission opportunity. In some aspects, UE 405 may select an ending symbol for the AUL transmission based at least in part on the scheduling request. For example, the UE 405 may determine that no scheduling request is to be transmitted during the transmission opportunity, and therefore select a last available symbol as the ending symbol for the AUL transmission. In another example, the UE 405 may determine that the scheduling request is to be transmitted during the transmission opportunity, and therefore select an intermediate symbol as the ending symbol for the AUL transmission. In some aspects, the UE 405 may select a transport block size for the AUL transmission based at least in part on the selected ending symbol. In some aspects, UE 405 may identify first subframe of the transmission opportunity that the UE 405 expects to receive and uplink grant, and select the ending symbol for the proceeding subframe based on the identification.

At 425, UE 405 may transmit (and base station 410 may receive) a physical layer scheduling request that includes a transmission size parameter for a second portion of the transmission opportunity. In some aspects, UE 405 may select the transmission size parameter based on one or more of a buffer size, on a resource block count for the SUL transmission, on an MCS for the SUL transmission, and the like. In some aspects, UE 405 may determine to transmit the scheduling request based at least in part on a size of the second portion of the transmission opportunity and one or more of a scheduling request processing delay, a UE encoding delay, an uplink grant transmission time, and the like. In some aspects, UE 405 may determine that its data buffer cannot be emptied using the AUL transmission during the first portion of the transmission opportunity. The UE 405 may transmit the scheduling request based at least in part on that determination. In some examples, the UE 405 may transmit an indication of an ending symbol selection with the scheduling request. In some aspects, the transmission size parameter may include a short buffer status report.

At 430, base station 410 may transmit (and UE 405 may receive) an uplink grant for the second portion of the transmission opportunity based at least in part on the scheduling request. In some aspects, base station 410 may identify a communication parameter associated with the SUL transmission, and determine a time duration for the second portion of the transmission opportunity based on the transmission size parameter and the communication parameter. Examples of the communication parameter may include, but are not limited to, an MCS parameter, a transport block size parameter, a channel performance parameter, and the like. In some aspects, the base station 410 may determine to transmit the uplink grant based at least in part on a size of the second portion of the transmission opportunity and one or more of an uplink grant processing delay and/or a UE encoding delay.

At 435, UE 405 may transmit (and base station 410 may receive) an SUL transmission over the shared radio frequency spectrum band during the second portion of the transmission opportunity according to the uplink grant.

Figure 5:
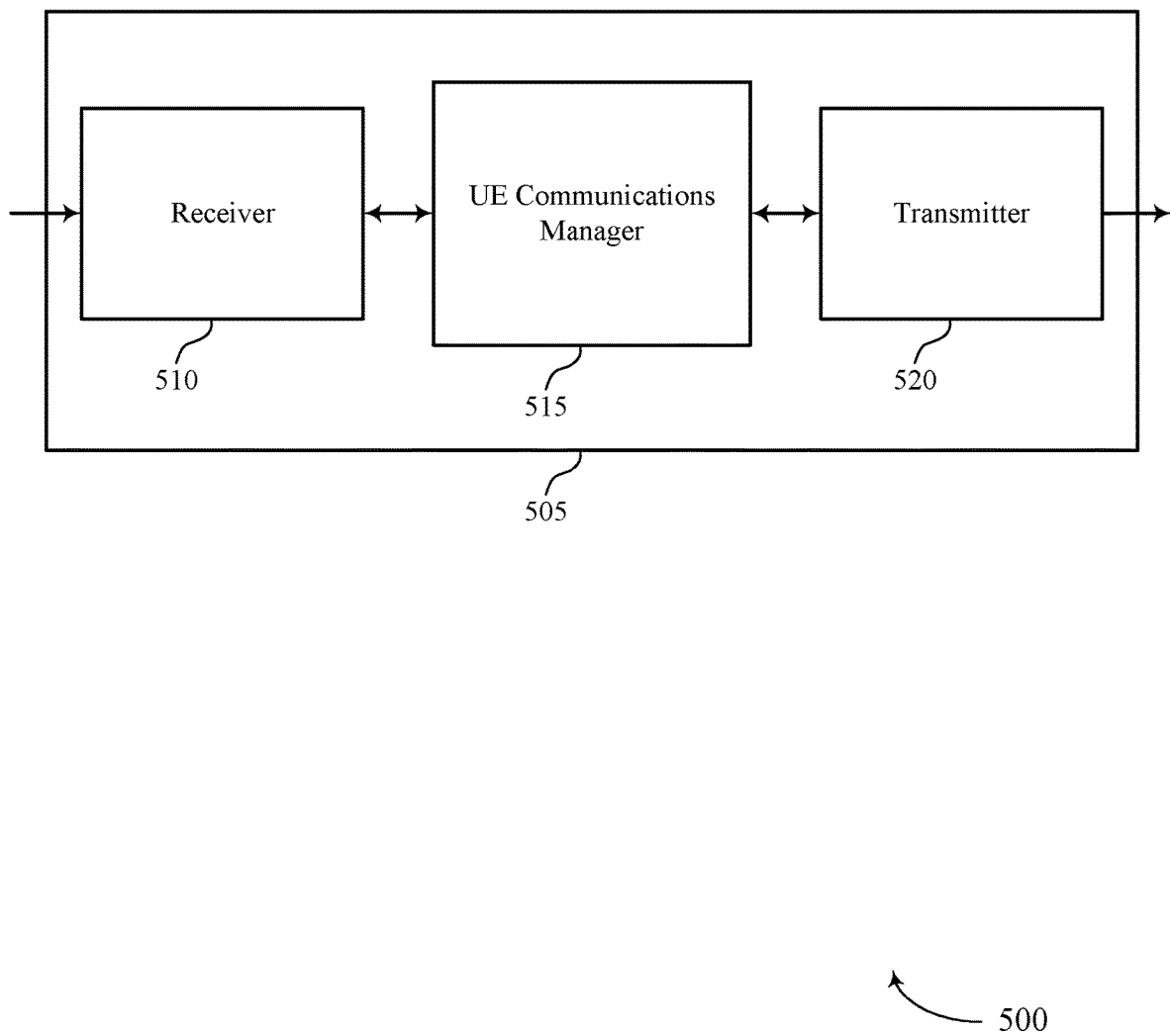
FIGS. 5 through 7 show block diagrams of a device that supports transmission opportunity sharing for AUL in accordance with aspects of the present disclosure.

FIG. 5 shows a block diagram 500 of a wireless device 505 that supports transmission opportunity sharing for AUL in accordance with aspects of the present disclosure. Wireless device 505 may be an example of aspects of a UE 115 as described herein. Wireless device 505 may include receiver 510, UE communications manager 515, and transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, and information related to transmission opportunity sharing for AUL, etc.). Information may be passed on to other components of the device 505. The receiver 510 may be an example of aspects of the transceiver 835 described with reference to FIG. 8. The receiver 510 may utilize a single antenna or a set of antennas.

UE communications manager 515 may be an example of aspects of the UE communications manager 815 described with reference to FIG. 8.

UE communications manager 515 and/or at least some of its various sub-components may be implemented in hardware, software executed by a processor, firmware, or any combination thereof. If implemented in software executed by a processor, the functions of the UE communications manager 515 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The UE communications manager 515 and/or at least some of its various sub-components may be physically located at various positions, including being distributed such that portions of functions are implemented at different physical locations by one or more physical devices. In some examples, UE communications manager 515 and/or at least some of its various sub-components may be a separate and distinct component in accordance with various aspects of the present disclosure. In other examples, UE communications manager 515 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 515 may obtain access to a shared radio frequency spectrum band for a transmission opportunity, perform an autonomous uplink transmission over the shared radio frequency spectrum band during a first portion of the transmission opportunity, transmit a physical layer scheduling request including a transmission size parameter for a second portion of the transmission opportunity, receive an uplink grant for the second portion of the transmission opportunity based on the scheduling request, and perform a scheduled uplink transmission over the shared radio frequency spectrum band during the second portion of the transmission opportunity according to the uplink grant.

Transmitter 520 may transmit signals generated by other components of the device 505. In some examples, the transmitter 520 may be collocated with a receiver 510 in a transceiver module. For example, the transmitter 520 may be an example of aspects of the transceiver 835 described with reference to FIG. 8. The transmitter 520 may utilize a single antenna or a set of antennas.

Figure 6:
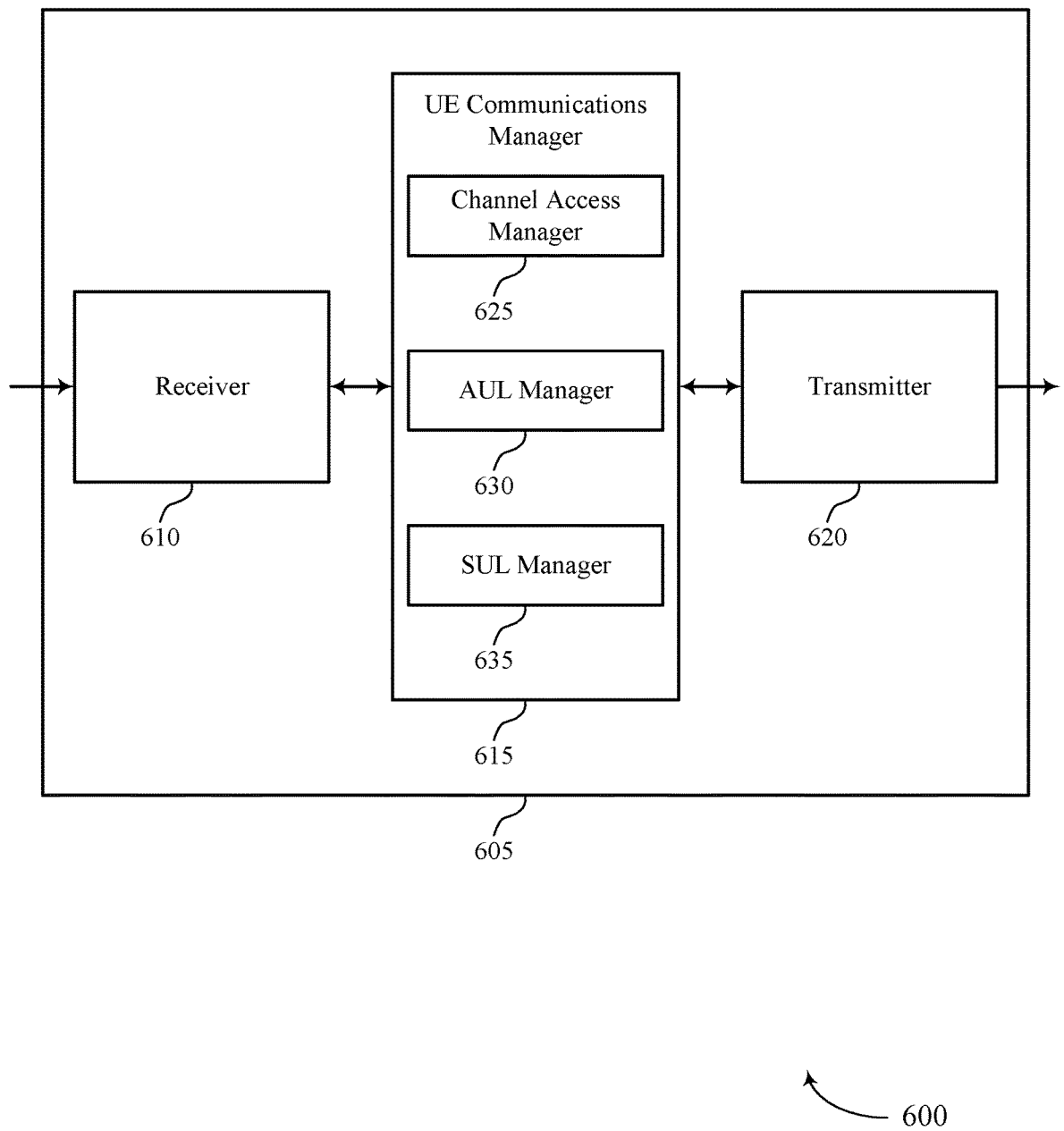

FIG. 6 shows a block diagram 600 of a wireless device 605 that supports transmission opportunity sharing for AUL in accordance with aspects of the present disclosure. Wireless device 605 may be an example of aspects of a wireless device 505 or a UE 115 as described with reference to FIG. 5. Wireless device 605 may include receiver 610, UE communications manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to transmission opportunity sharing for AUL, etc.). Information may be passed on to other components of the device 605. The receiver 610 may be an example of aspects of the transceiver 835 described with reference to FIG. 8. The receiver 610 may utilize a single antenna or a set of antennas.

UE communications manager 615 may be an example of aspects of the UE communications manager 815 described with reference to FIG. 8.

UE communications manager 615 may also include channel access manager 625, AUL manager 630, and SUL manager 635.

Channel access manager 625 may obtain access to a shared radio frequency spectrum band for a transmission opportunity. In some cases, the transmission opportunity includes at least one of a maximum channel occupancy time or a Wi-Fi TXOP.

AUL manager 630 may perform an autonomous uplink transmission over the shared radio frequency spectrum band during a first portion of the transmission opportunity and transmit a physical layer scheduling request including a transmission size parameter for a second portion of the transmission opportunity. In some cases, a transport block size used for the autonomous uplink transmission is different from the transport block size used for the scheduled uplink transmission.

SUL manager 635 may receive an uplink grant for the second portion of the transmission opportunity based on the scheduling request and perform a scheduled uplink transmission over the shared radio frequency spectrum band during the second portion of the transmission opportunity according to the uplink grant.

Transmitter 620 may transmit signals generated by other components of the device 605. In some examples, the transmitter 620 may be collocated with a receiver 610 in a transceiver module. For example, the transmitter 620 may be an example of aspects of the transceiver 835 described with reference to FIG. 8. The transmitter 620 may utilize a single antenna or a set of antennas.

Figure 7:
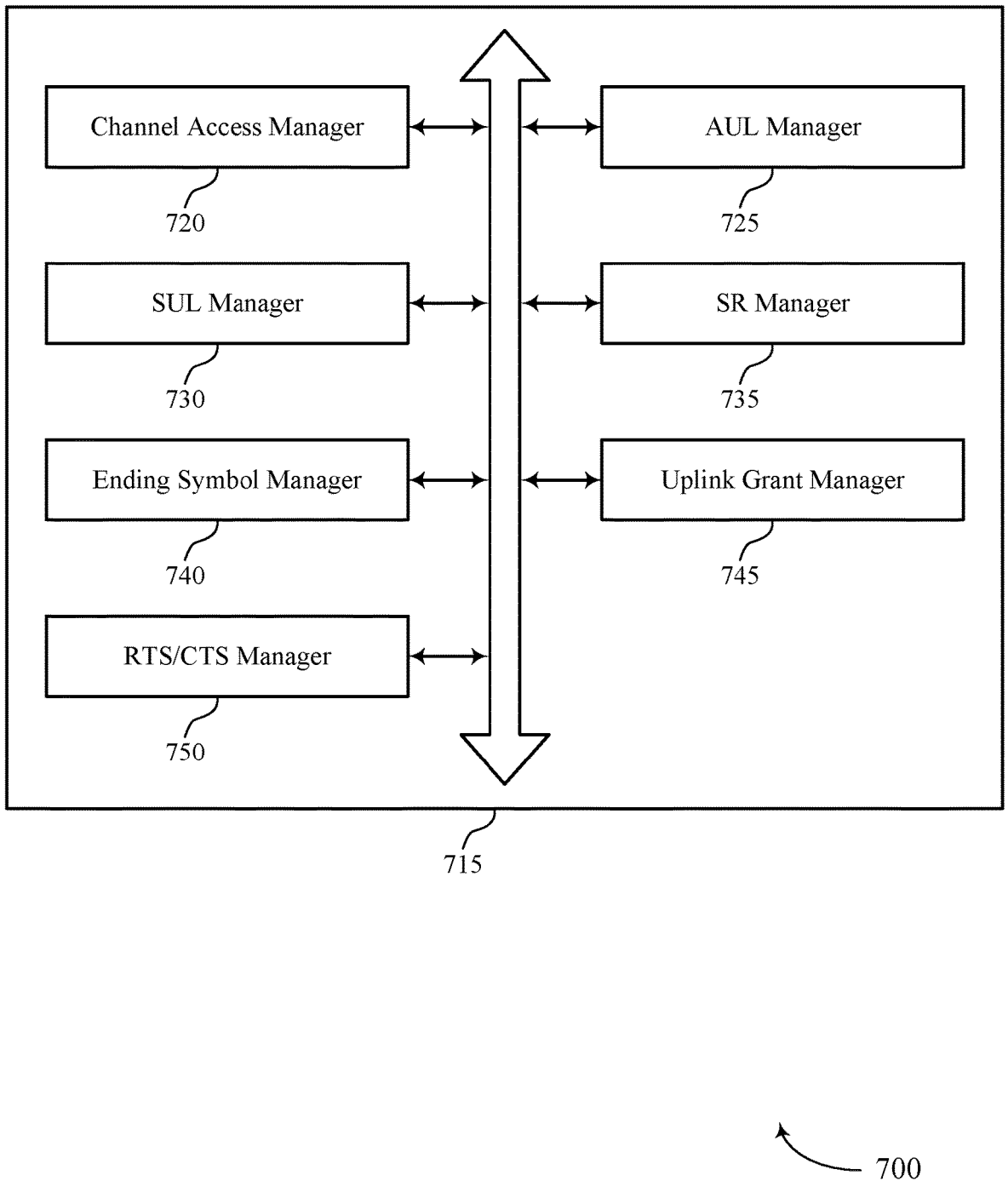

FIG. 7 shows a block diagram 700 of a UE communications manager 715 that supports transmission opportunity sharing for AUL in accordance with aspects of the present disclosure. The UE communications manager 715 may be an example of aspects of a UE communications manager 515, a UE communications manager 615, or a UE communications manager 815 described with reference to FIGS. 5, 6, and 8. The UE communications manager 715 may include channel access manager 720, AUL manager 725, SUL manager 730, SR manager 735, ending symbol manager 740, uplink grant manager 745, and RTS/CTS manager 750. Each of these modules may communicate, directly or indirectly, with one another (e.g., via one or more buses).

Channel access manager 720 may obtain access to a shared radio frequency spectrum band for a transmission opportunity. In some cases, the transmission opportunity includes at least one of a maximum channel occupancy time or a Wi-Fi TXOP.

AUL manager 725 may perform an autonomous uplink transmission over the shared radio frequency spectrum band during a first portion of the transmission opportunity and transmit a physical layer scheduling request including a transmission size parameter for a second portion of the transmission opportunity. In some cases, a transport block size used for the autonomous uplink transmission is different from the transport block size used for the scheduled uplink transmission.

SUL manager 730 may receive an uplink grant for the second portion of the transmission opportunity based on the scheduling request and perform a scheduled uplink transmission over the shared radio frequency spectrum band during the second portion of the transmission opportunity according to the uplink grant.

SR manager 735 may select the transmission size parameter based on one or more of a buffer size, or a resource block count for the scheduled uplink transmission, or a modulation and coding scheme (MCS) for the scheduled uplink transmission, determine to transmit the scheduling request based on a size of the second portion of the transmission opportunity and one or more of a scheduling request processing delay, or a UE encoding delay, or an uplink grant transmission time, determine that a data buffer cannot be emptied using the autonomous uplink transmission during the first portion of the transmission opportunity, and transmit the scheduling request is based on the determining. In some cases, the transmission size parameter includes a short buffer status report.

Ending symbol manager 740 may select an ending symbol for the autonomous uplink transmission based on the scheduling request, determine that no scheduling request is to be transmitted during the transmission opportunity, select a last available symbol as the ending symbol based on the determining, determine that the scheduling request is to be transmitted during the transmission opportunity, select an intermediate available symbol as the ending symbol based on the determining, transmit an indication of the ending symbol selection with the scheduling request, and select a transport block size for the autonomous uplink transmission based on the selected ending symbol of the autonomous uplink transmission.

Uplink grant manager 745 may identify a first subframe of the transmission opportunity associated with an expected receipt of the uplink grant by the UE 115 and select an ending symbol for a second subframe preceding the first subframe based on the identifying.

RTS/CTS manager 750 may transmit the scheduling request in an RTS frame, receive the uplink grant in a CTS frame, and perform the scheduled uplink transmission during a data frame occurring after the CTS frame. In some cases, at least a portion of the autonomous uplink transmission includes the RTS frame. In some cases, the RTS frame is transmitted when channel access is obtained. In some cases, the RTS frame includes a floating RTS frame in that the RTS frame is not aligned with respect to a subframe boundary.

Figure 8:
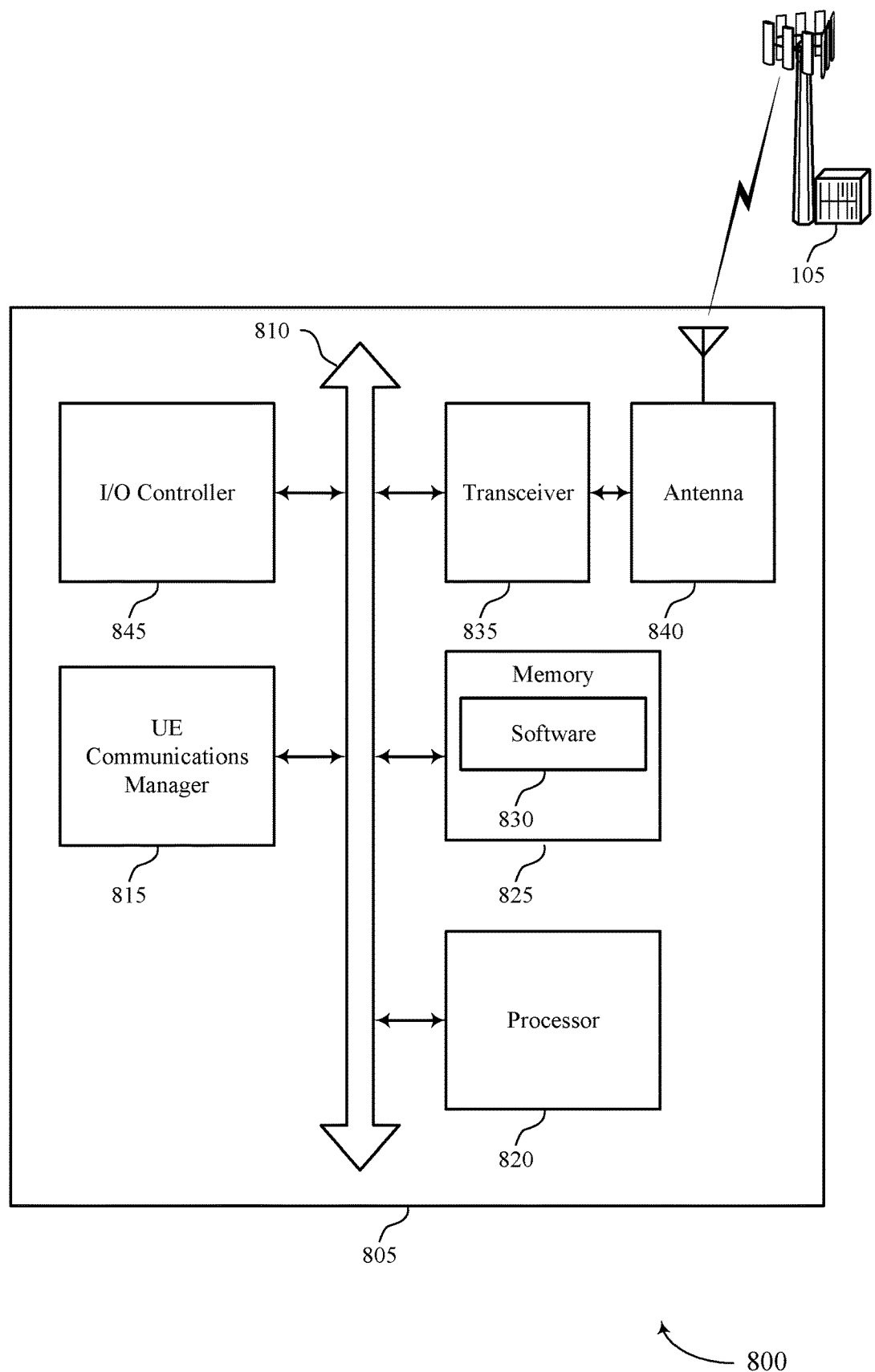
FIG. 8 illustrates a block diagram of a system including a UE that supports transmission opportunity sharing for AUL in accordance with aspects of the present disclosure.

FIG. 8 shows a diagram of a system 800 including a device 805 that supports transmission opportunity sharing for AUL in accordance with aspects of the present disclosure. Device 805 may be an example of or include the components of wireless device 505, wireless device 605, or a UE 115 as described above, e.g., with reference to FIGS. 5 and 6. Device 805 may include components for bi-directional voice and data communications including components for transmitting and receiving communications, including UE communications manager 815, processor 820, memory 825, software 830, transceiver 835, antenna 840, and I/O controller 845. These components may be in electronic communication via one or more buses (e.g., bus 810). Device 805 may communicate wirelessly with one or more base stations 105.

Processor 820 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 820 may be configured to operate a memory array using a memory controller. In other cases, a memory controller may be integrated into processor 820. Processor 820 may be configured to execute computer-readable instructions stored in a memory to perform various functions (e.g., functions or tasks supporting transmission opportunity sharing for AUL).

Memory 825 may include random access memory (RAM) and read only memory (ROM). The memory 825 may store computer-readable, computer-executable software 830 including instructions that, when executed, cause the processor to perform various functions described herein. In some cases, the memory 825 may contain, among other things, a basic input/output system (BIOS) which may control basic hardware or software operation such as the interaction with peripheral components or devices.

Software 830 may include code to implement aspects of the present disclosure, including code to support transmission opportunity sharing for AUL. Software 830 may be stored in a non-transitory computer-readable medium such as system memory or other memory. In some cases, the software 830 may not be directly executable by the processor but may cause a computer (e.g., when compiled and executed) to perform functions described herein.

Transceiver 835 may communicate bi-directionally, via one or more antennas, wired, or wireless links as described above. For example, the transceiver 835 may represent a wireless transceiver and may communicate bi-directionally with another wireless transceiver. The transceiver 835 may also include a modem to modulate the packets and provide the modulated packets to the antennas for transmission, and to demodulate packets received from the antennas.

In some cases, the wireless device 805 may include a single antenna 840. However, in some cases the device 805 may have more than one antenna 840, which may be capable of concurrently transmitting or receiving multiple wireless transmissions.

I/O controller 845 may manage input and output signals for device 805. I/O controller 845 may also manage peripherals not integrated into device 805. In some cases, I/O controller 845 may represent a physical connection or port to an external peripheral. In some cases, I/O controller 845 may utilize an operating system such as iOS®, ANDROID®, MS-DOS®, MS-WINDOWS®, OS/2®, UNIX®, LINUX®, or another known operating system. In other cases, I/O controller 845 may represent or interact with a modem, a keyboard, a mouse, a touchscreen, or a similar device. In some cases, I/O controller 845 may be implemented as part of a processor. In some cases, a user may interact with device 805 via I/O controller 845 or via hardware components controlled by I/O controller 845.

Figure 9:
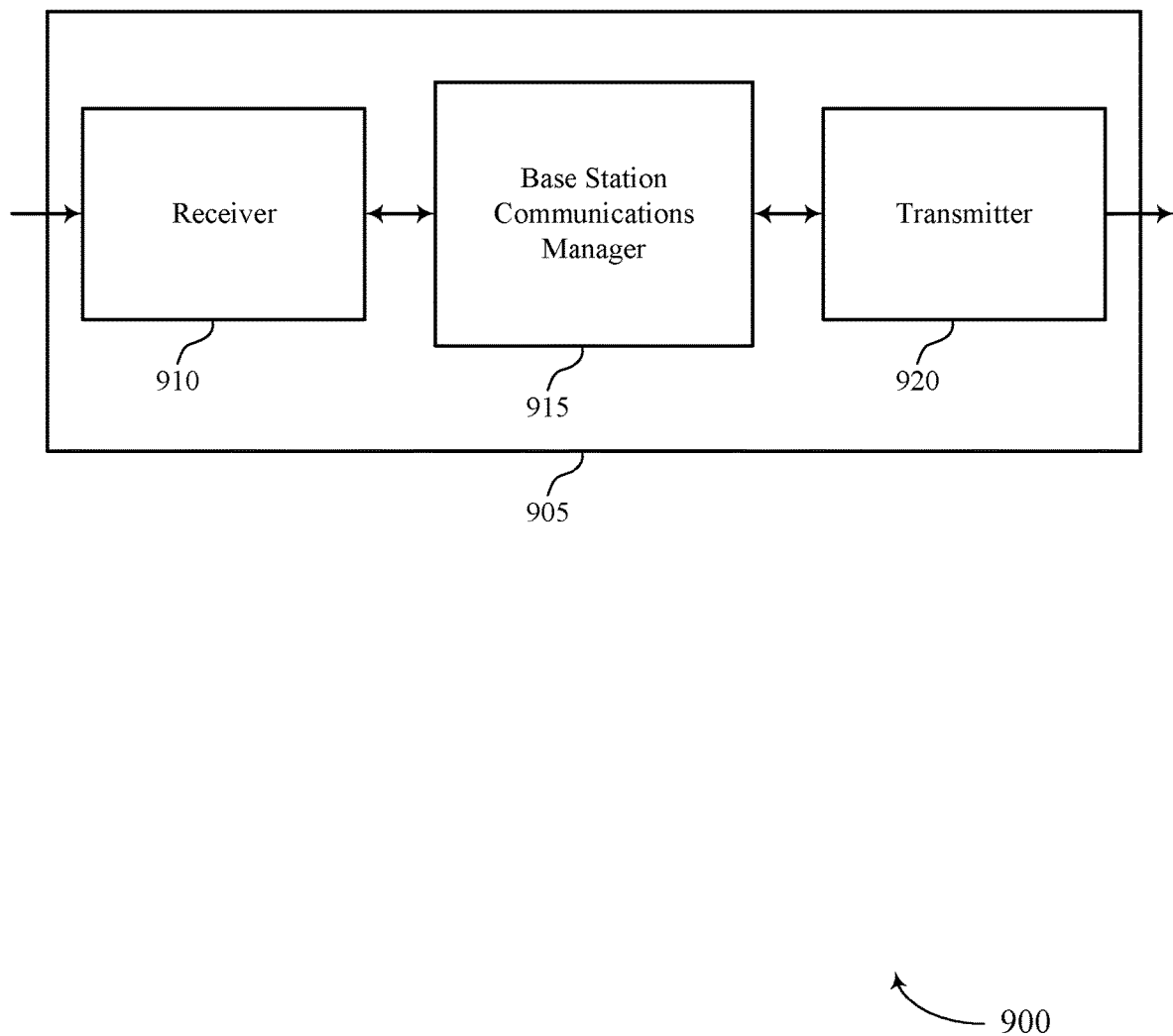
FIGS. 9 through 11 show block diagrams of a device that supports transmission opportunity sharing for AUL in accordance with aspects of the present disclosure.

FIG. 9 shows a block diagram 900 of a wireless device 905 that supports transmission opportunity sharing for AUL in accordance with aspects of the present disclosure. Wireless device 905 may be an example of aspects of a base station 105 as described herein. Wireless device 905 may include receiver 910, base station communications manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to transmission opportunity sharing for AUL, etc.). Information may be passed on to other components of the device 905. The receiver 910 may be an example of aspects of the transceiver 1235 described with reference to FIG. 12. The receiver 910 may utilize a single antenna or a set of antennas.

Base station communications manager 915 may be an example of aspects of the base station communications manager 1215 described with reference to FIG. 12.

Base station communications manager 915 and/or at least some of its various sub-components may be implemented in hardware, software executed by a processor, firmware, or any combination thereof. If implemented in software executed by a processor, the functions of the base station communications manager 915 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The base station communications manager 915 and/or at least some of its various sub-components may be physically located at various positions, including being distributed such that portions of functions are implemented at different physical locations by one or more physical devices. In some examples, base station communications manager 915 and/or at least some of its various sub-components may be a separate and distinct component in accordance with various aspects of the present disclosure. In other examples, base station communications manager 915 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 915 may receive an autonomous uplink transmission over a shared radio frequency spectrum band during a first portion of a transmission opportunity, receive a physical layer scheduling request including a transmission size parameter for a second portion of the transmission opportunity, transmit an uplink grant for the second portion of the transmission opportunity based on the scheduling request, and receive a scheduled uplink transmission over the shared radio frequency spectrum during the second portion of the transmission opportunity according to the uplink grant.

Transmitter 920 may transmit signals generated by other components of the device 905. In some examples, the transmitter 920 may be collocated with a receiver 910 in a transceiver module. For example, the transmitter 920 may be an example of aspects of the transceiver 1235 described with reference to FIG. 12. The transmitter 920 may utilize a single antenna or a set of antennas.

Figure 10:
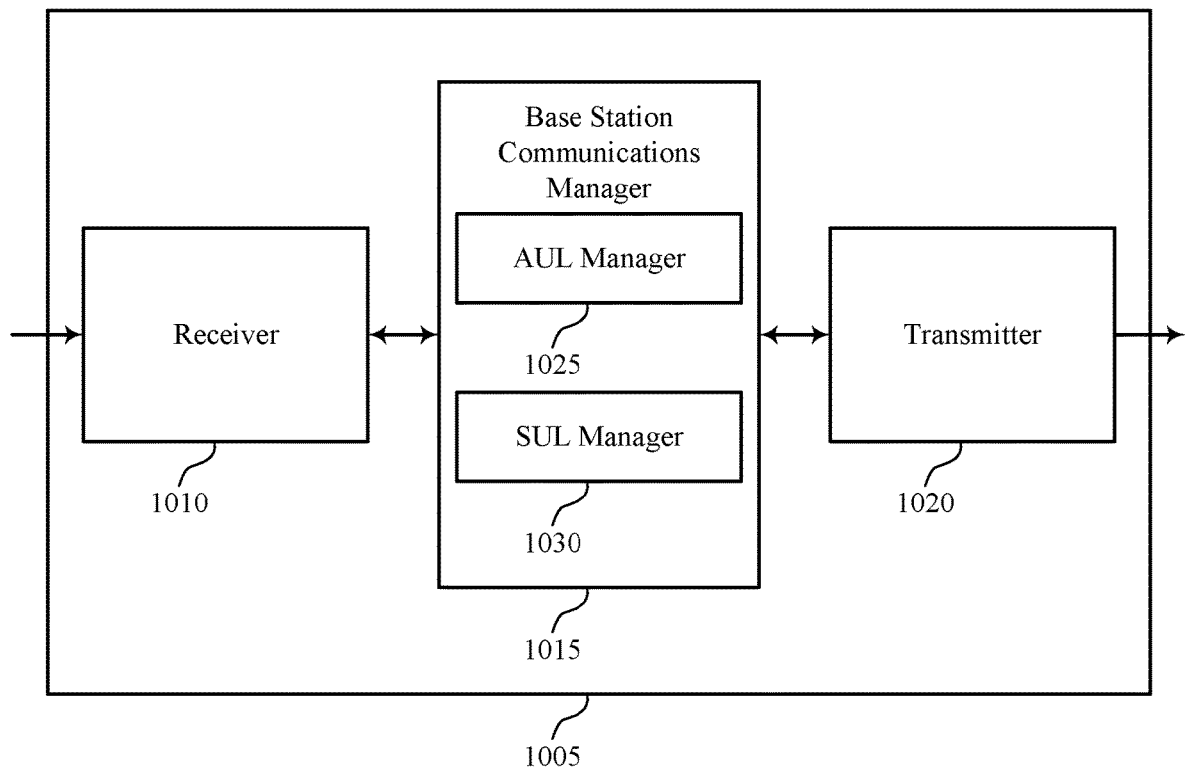

FIG. 10 shows a block diagram 1000 of a wireless device 1005 that supports transmission opportunity sharing for AUL in accordance with aspects of the present disclosure. Wireless device 1005 may be an example of aspects of a wireless device 905 or a base station 105 as described with reference to FIG. 9. Wireless device 1005 may include receiver 1010, base station communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to transmission opportunity sharing for AUL, etc.). Information may be passed on to other components of the device 1005. The receiver 1010 may be an example of aspects of the transceiver 1235 described with reference to FIG. 12. The receiver 1010 may utilize a single antenna or a set of antennas.

Base station communications manager 1015 may be an example of aspects of the base station communications manager 1215 described with reference to FIG. 12.

Base station communications manager 1015 may also include AUL manager 1025 and SUL manager 1030.

AUL manager 1025 may receive an autonomous uplink transmission over a shared radio frequency spectrum band during a first portion of a transmission opportunity and receive a physical layer scheduling request including a transmission size parameter for a second portion of the transmission opportunity. In some cases, the transmission opportunity includes at least one of a maximum channel occupancy time transmission opportunity or a Wi-Fi transmission opportunity. In some cases, a transport block size used for the autonomous uplink transmission is different from the transport block size used for the scheduled uplink transmission.

SUL manager 1030 may transmit an uplink grant for the second portion of the transmission opportunity based on the scheduling request and receive a scheduled uplink transmission over the shared radio frequency spectrum during the second portion of the transmission opportunity according to the uplink grant.

Transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1235 described with reference to FIG. 12. The transmitter 1020 may utilize a single antenna or a set of antennas.

Figure 11:
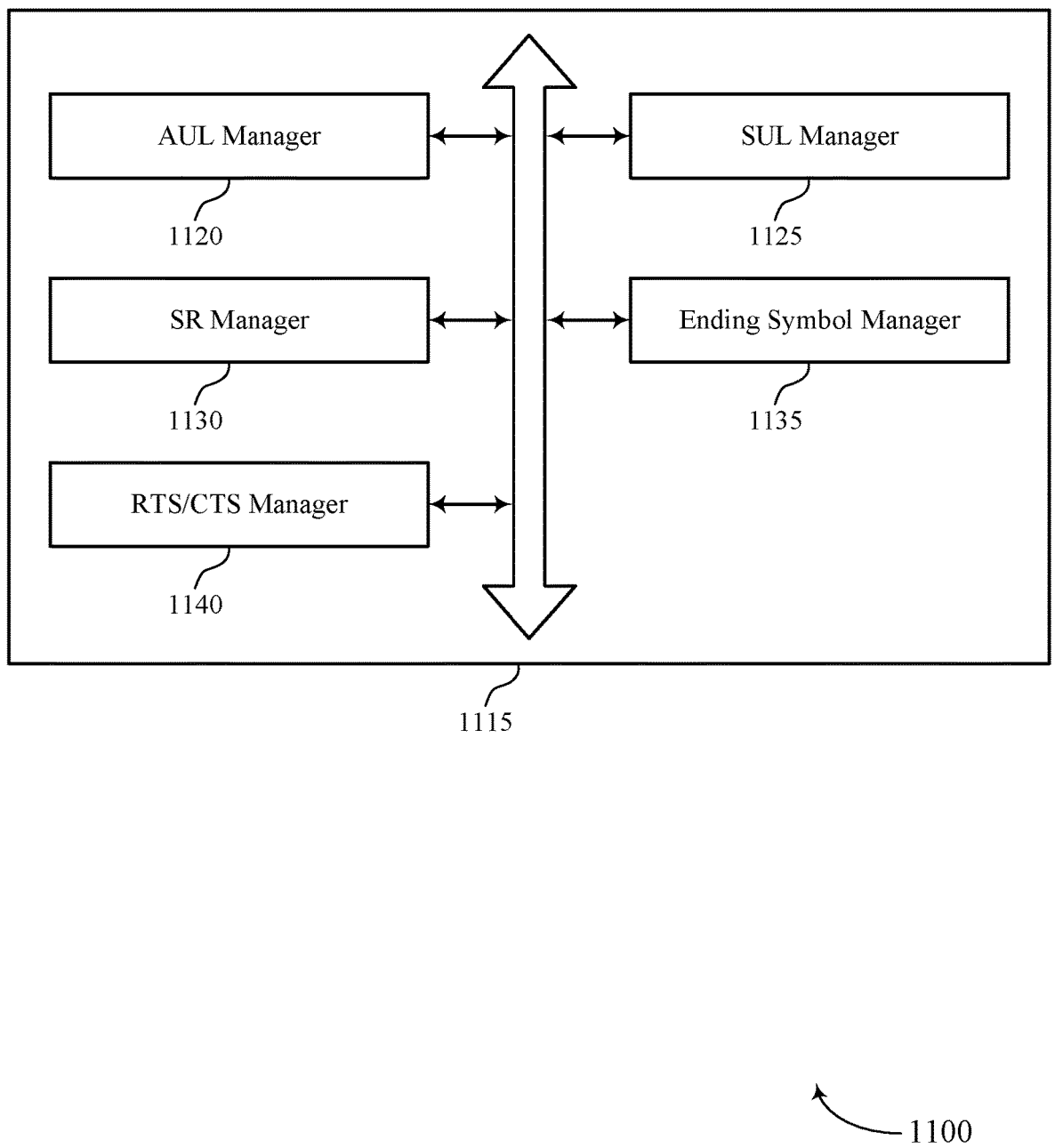

FIG. 11 shows a block diagram 1100 of a base station communications manager 1115 that supports transmission opportunity sharing for AUL in accordance with aspects of the present disclosure. The base station communications manager 1115 may be an example of aspects of a base station communications manager 1215 described with reference to FIGS. 9, 10, and 12. The base station communications manager 1115 may include AUL manager 1120, SUL manager 1125, SR manager 1130, ending symbol manager 1135, and RTS/CTS manager 1140. Each of these modules may communicate, directly or indirectly, with one another (e.g., via one or more buses).

AUL manager 1120 may receive an autonomous uplink transmission over a shared radio frequency spectrum band during a first portion of a transmission opportunity and receive a physical layer scheduling request including a transmission size parameter for a second portion of the transmission opportunity. In some cases, the transmission opportunity includes at least one of a maximum channel occupancy time transmission opportunity or a Wi-Fi transmission opportunity. In some cases, a transport block size used for the autonomous uplink transmission is different from the transport block size used for the scheduled uplink transmission.

SUL manager 1125 may transmit an uplink grant for the second portion of the transmission opportunity based on the scheduling request and receive a scheduled uplink transmission over the shared radio frequency spectrum during the second portion of the transmission opportunity according to the uplink grant.

SR manager 1130 may identify a communication parameter associated with the scheduled uplink transmission, determine a time duration for the second portion of the transmission opportunity based on the transmission size parameter and the communication parameter, and determine to transmit the uplink grant based on a size of the second portion of the transmission opportunity and one or more of: an uplink grant processing delay or a UE encoding delay. In some cases, the communication parameter include one or more of a modulation and coding scheme parameter, or a transport block size parameter, or a channel performance parameter, or a combination thereof. In some cases, the transmission size parameter includes a short buffer status report.

Ending symbol manager 1135 may receive a signal indicating an ending symbol selection for the autonomous uplink transmission, the signal being received with the scheduling request.

RTS/CTS manager 1140 may receive the scheduling request in an RTS frame, transmit the uplink grant in a CTS frame, and receive the scheduled uplink transmission during a data frame occurring after the CTS frame. In some cases, at least a portion of the autonomous uplink transmission includes the RTS frame. In some cases, the RTS frame includes a floating RTS frame in that the RTS frame is not aligned with respect to a subframe boundary.

Figure 12:
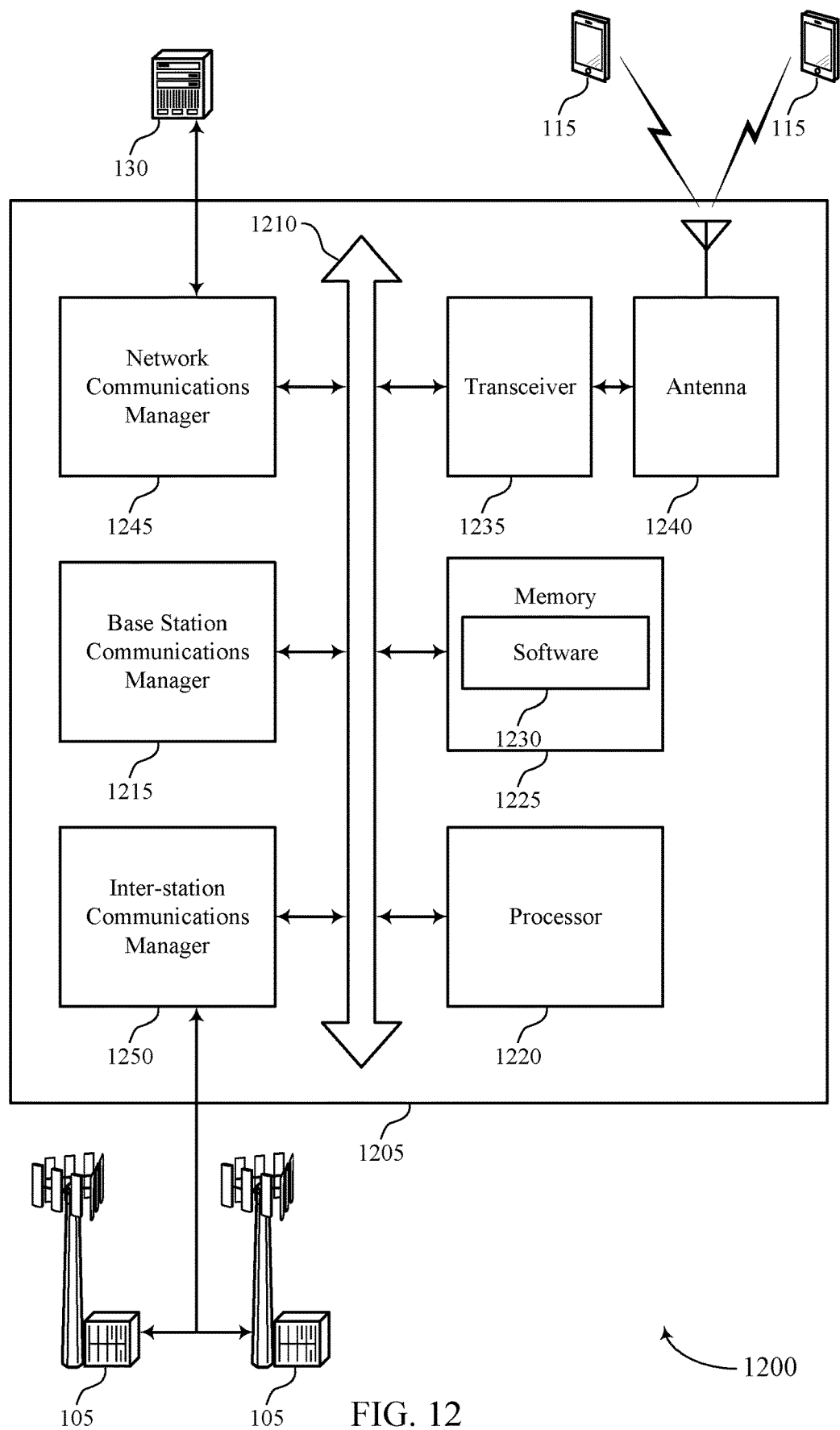
FIG. 12 illustrates a block diagram of a system including a base station that supports transmission opportunity sharing for AUL in accordance with aspects of the present disclosure.

FIG. 12 shows a diagram of a system 1200 including a device 1205 that supports transmission opportunity sharing for AUL in accordance with aspects of the present disclosure. Device 1205 may be an example of or include the components of base station 105 as described above, e.g., with reference to FIG. 1. Device 1205 may include components for bi-directional voice and data communications including components for transmitting and receiving communications, including base station communications manager 1215, processor 1220, memory 1225, software 1230, transceiver 1235, antenna 1240, network communications manager 1245, and inter-station communications manager 1250. These components may be in electronic communication via one or more buses (e.g., bus 1210). Device 1205 may communicate wirelessly with one or more UEs 115.

Processor 1220 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1220 may be configured to operate a memory array using a memory controller. In other cases, a memory controller may be integrated into processor 1220. Processor 1220 may be configured to execute computer-readable instructions stored in a memory to perform various functions (e.g., functions or tasks supporting transmission opportunity sharing for AUL).

Memory 1225 may include RAM and ROM. The memory 1225 may store computer-readable, computer-executable software 1230 including instructions that, when executed, cause the processor to perform various functions described herein. In some cases, the memory 1225 may contain, among other things, a BIOS which may control basic hardware or software operation such as the interaction with peripheral components or devices.

Software 1230 may include code to implement aspects of the present disclosure, including code to support transmission opportunity sharing for AUL. Software 1230 may be stored in a non-transitory computer-readable medium such as system memory or other memory. In some cases, the software 1230 may not be directly executable by the processor but may cause a computer (e.g., when compiled and executed) to perform functions described herein.

Transceiver 1235 may communicate bi-directionally, via one or more antennas, wired, or wireless links as described above. For example, the transceiver 1235 may represent a wireless transceiver and may communicate bi-directionally with another wireless transceiver. The transceiver 1235 may also include a modem to modulate the packets and provide the modulated packets to the antennas for transmission, and to demodulate packets received from the antennas.

In some cases, the wireless device 1205 may include a single antenna 1240. However, in some cases the device 1205 may have more than one antenna 1240, which may be capable of concurrently transmitting or receiving multiple wireless transmissions.

Network communications manager 1245 may manage communications with the core network (e.g., via one or more wired backhaul links). For example, the network communications manager 1245 may manage the transfer of data communications for client devices, such as one or more UEs 115.

Inter-station communications manager 1250 may manage communications with other base station 105, and may include a controller or scheduler for controlling communications with UEs 115 in cooperation with other base stations 105. For example, the inter-station communications manager 1250 may coordinate scheduling for transmissions to UEs 115 for various interference mitigation techniques such as beamforming or joint transmission. In some examples, inter-station communications manager 1250 may provide an X2 interface within an LTE/LTE-A wireless communication network technology to provide communication between base stations 105.

Figure 13:
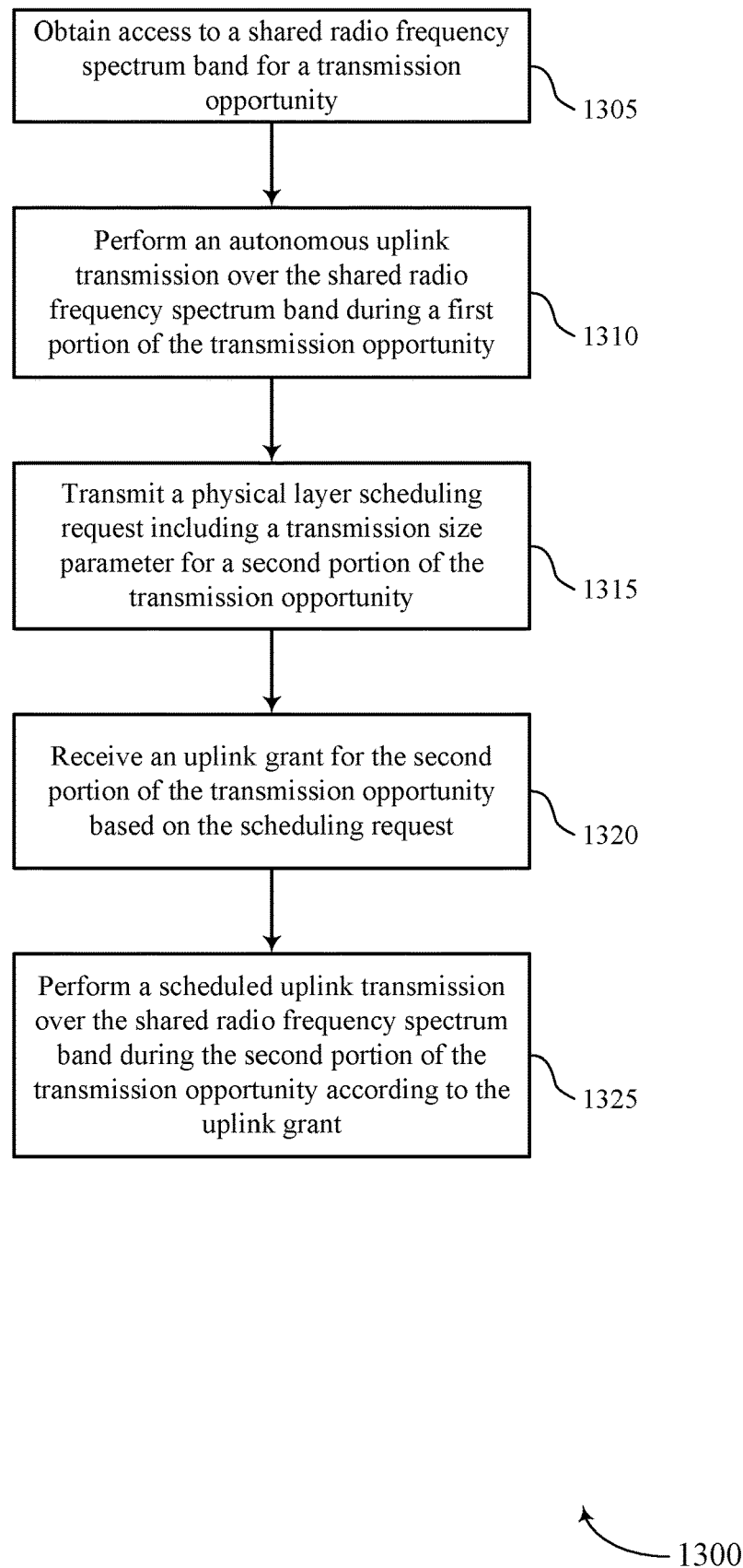
FIGS. 13 through 16 illustrate methods for transmission opportunity sharing for AUL in accordance with aspects of the present disclosure.

FIG. 13 shows a flowchart illustrating a method 1300 for transmission opportunity sharing for AUL in accordance with aspects of the present disclosure. The operations of method 1300 may be implemented by a UE 115 or its components as described herein. For example, the operations of method 1300 may be performed by a UE communications manager as described with reference to FIGS. 5 through 8. In some examples, a UE 115 may execute a set of codes to control the functional elements of the device to perform the functions described below. Additionally or alternatively, the UE 115 may perform aspects of the functions described below using special-purpose hardware.

At 1305, the UE 115 may obtain access to a shared radio frequency spectrum band for a transmission opportunity. The operations of 1305 may be performed according to the methods described herein. In certain examples, aspects of the operations of 1305 may be performed by a channel access manager as described with reference to FIGS. 5 through 8.

At 1310, the UE 115 may perform an autonomous uplink transmission over the shared radio frequency spectrum band during a first portion of the transmission opportunity. The operations of 1310 may be performed according to the methods described herein. In certain examples, aspects of the operations of 1310 may be performed by a AUL manager as described with reference to FIGS. 5 through 8.

At 1315, the UE 115 may transmit a physical layer scheduling request including a transmission size parameter for a second portion of the transmission opportunity. The operations of 1315 may be performed according to the methods described herein. In certain examples, aspects of the operations of 1315 may be performed by a AUL manager as described with reference to FIGS. 5 through 8.

At 1320, the UE 115 may receive an uplink grant for the second portion of the transmission opportunity based at least in part on the scheduling request. The operations of 1320 may be performed according to the methods described herein. In certain examples, aspects of the operations of 1320 may be performed by an SUL manager as described with reference to FIGS. 5 through 8.

At 1325, the UE 115 may perform a scheduled uplink transmission over the shared radio frequency spectrum band during the second portion of the transmission opportunity according to the uplink grant. The operations of 1325 may be performed according to the methods described herein. In certain examples, aspects of the operations of 1325 may be performed by an SUL manager as described with reference to FIGS. 5 through 8.

Figure 14:
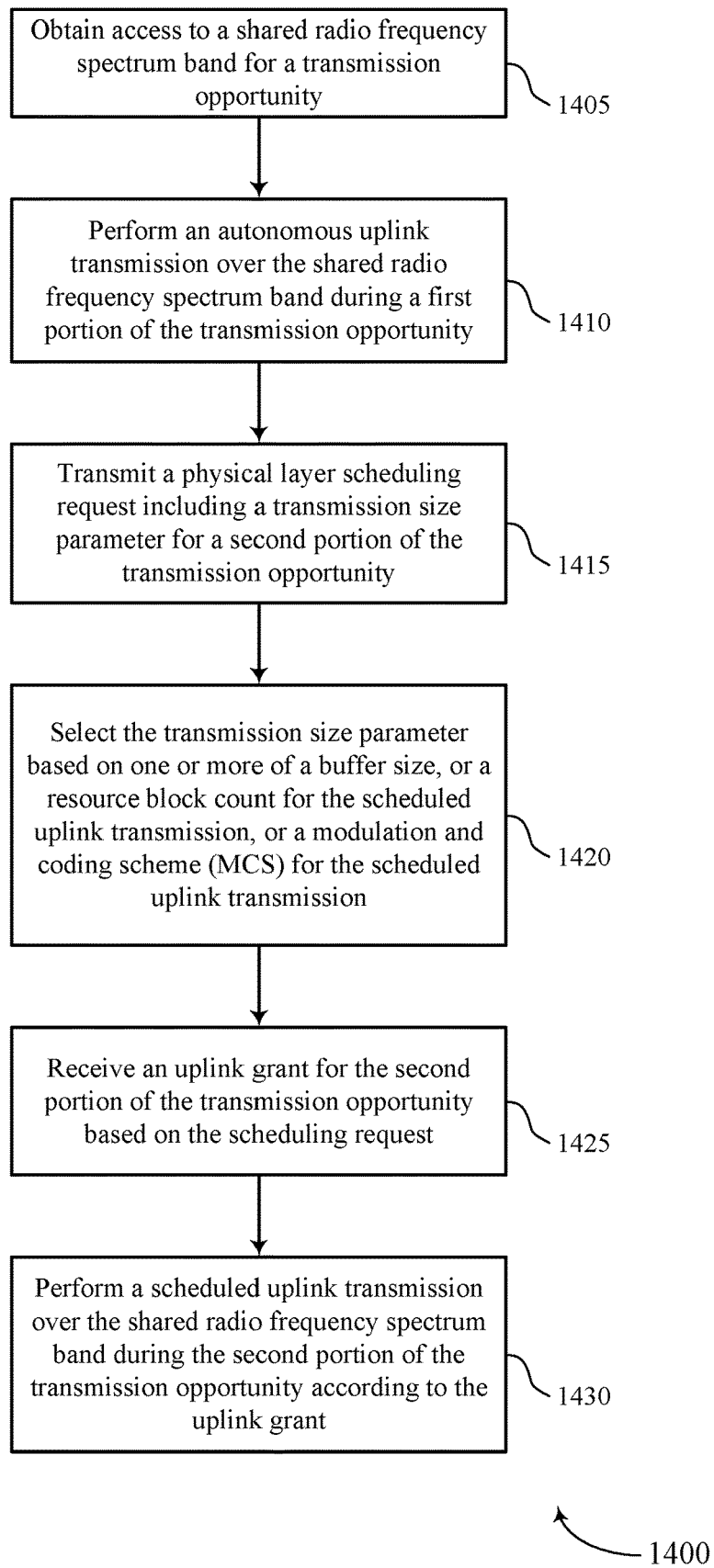

FIG. 14 shows a flowchart illustrating a method 1400 for transmission opportunity sharing for AUL in accordance with aspects of the present disclosure. The operations of method 1400 may be implemented by a UE 115 or its components as described herein. For example, the operations of method 1400 may be performed by a UE communications manager as described with reference to FIGS. 5 through 8. In some examples, a UE 115 may execute a set of codes to control the functional elements of the device to perform the functions described below. Additionally or alternatively, the UE 115 may perform aspects of the functions described below using special-purpose hardware.

At 1405, the UE 115 may obtain access to a shared radio frequency spectrum band for a transmission opportunity. The operations of 1405 may be performed according to the methods described herein. In certain examples, aspects of the operations of 1405 may be performed by a channel access manager as described with reference to FIGS. 5 through 8.

At 1410, the UE 115 may perform an autonomous uplink transmission over the shared radio frequency spectrum band during a first portion of the transmission opportunity. The operations of 1410 may be performed according to the methods described herein. In certain examples, aspects of the operations of 1410 may be performed by a AUL manager as described with reference to FIGS. 5 through 8.

At 1415, the UE 115 may transmit a physical layer scheduling request including a transmission size parameter for a second portion of the transmission opportunity. The operations of 1415 may be performed according to the methods described herein. In certain examples, aspects of the operations of 1415 may be performed by a AUL manager as described with reference to FIGS. 5 through 8.

At 1420, the UE 115 may select the transmission size parameter based at least in part on one or more of a buffer size, or a resource block count for the scheduled uplink transmission, or a modulation and coding scheme (MCS) for the scheduled uplink transmission. The operations of 1420 may be performed according to the methods described herein. In certain examples, aspects of the operations of 1420 may be performed by a SR manager as described with reference to FIGS. 5 through 8.

At 1425, the UE 115 may receive an uplink grant for the second portion of the transmission opportunity based at least in part on the scheduling request. The operations of 1425 may be performed according to the methods described herein. In certain examples, aspects of the operations of 1425 may be performed by a SUL manager as described with reference to FIGS. 5 through 8.

At 1430, the UE 115 may perform a scheduled uplink transmission over the shared radio frequency spectrum band during the second portion of the transmission opportunity according to the uplink grant. The operations of 1430 may be performed according to the methods described herein. In certain examples, aspects of the operations of 1430 may be performed by a SUL manager as described with reference to FIGS. 5 through 8.

Figure 15:
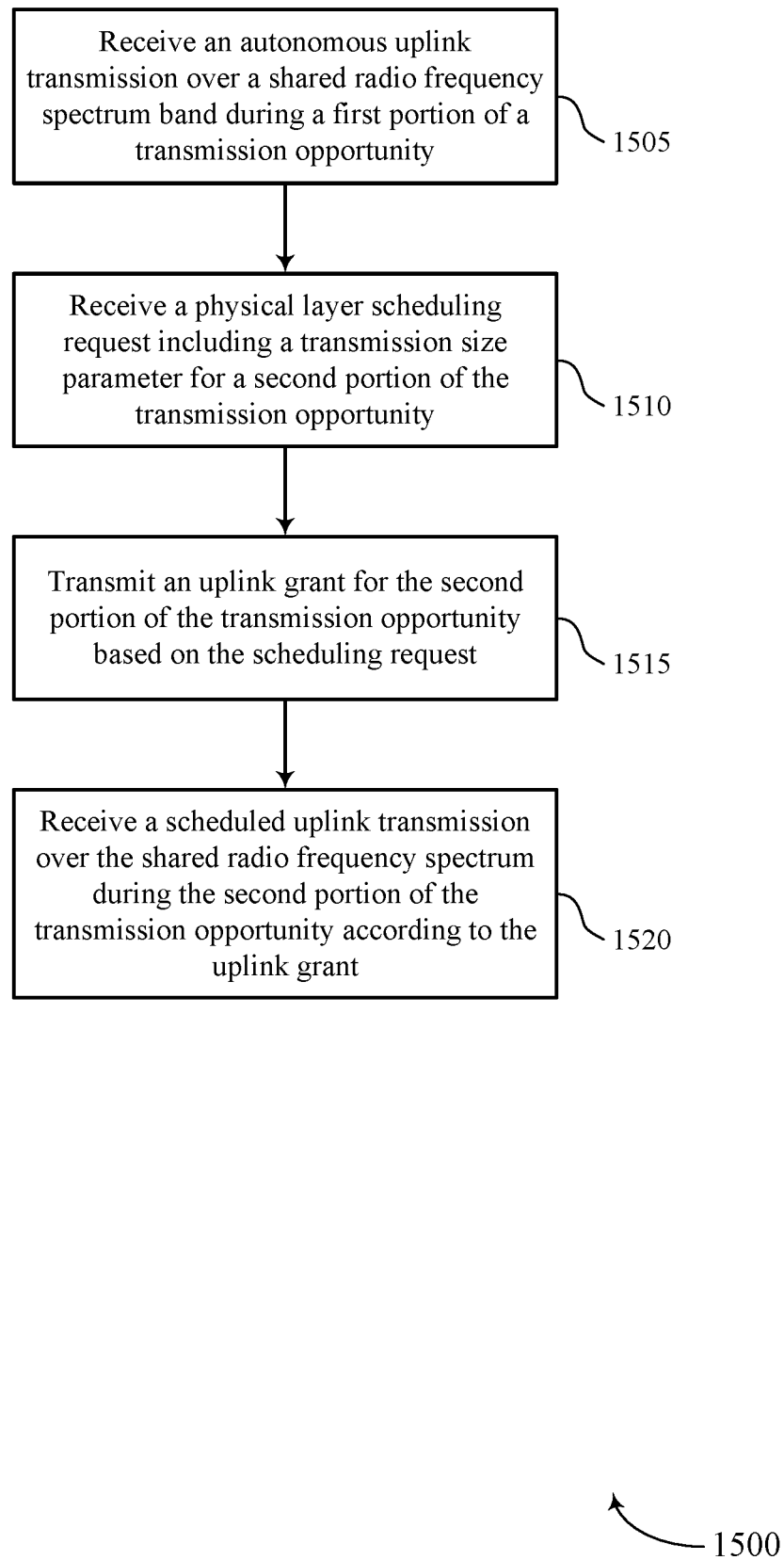

FIG. 15 shows a flowchart illustrating a method 1500 for transmission opportunity sharing for AUL in accordance with aspects of the present disclosure. The operations of method 1500 may be implemented by a base station 105 or its components as described herein. For example, the operations of method 1500 may be performed by a base station communications manager as described with reference to FIGS. 9 through 12. In some examples, a base station 105 may execute a set of codes to control the functional elements of the device to perform the functions described below. Additionally or alternatively, the base station 105 may perform aspects of the functions described below using special-purpose hardware.

At 1505, the base station 105 may receive an autonomous uplink transmission over a shared radio frequency spectrum band during a first portion of a transmission opportunity. The operations of 1505 may be performed according to the methods described herein. In certain examples, aspects of the operations of 1505 may be performed by a AUL manager as described with reference to FIGS. 9 through 12.

At 1510, the base station 105 may receive a physical layer scheduling request comprising a transmission size parameter for a second portion of the transmission opportunity. The operations of 1510 may be performed according to the methods described herein. In certain examples, aspects of the operations of 1510 may be performed by a AUL manager as described with reference to FIGS. 9 through 12.

At 1515, the base station 105 may transmit an uplink grant for the second portion of the transmission opportunity based at least in part on the scheduling request. The operations of 1515 may be performed according to the methods described herein. In certain examples, aspects of the operations of 1515 may be performed by a SUL manager as described with reference to FIGS. 9 through 12.

At 1520, the base station 105 may receive a scheduled uplink transmission over the shared radio frequency spectrum during the second portion of the transmission opportunity according to the uplink grant. The operations of 1520 may be performed according to the methods described herein. In certain examples, aspects of the operations of 1520 may be performed by a SUL manager as described with reference to FIGS. 9 through 12.

Figure 16:
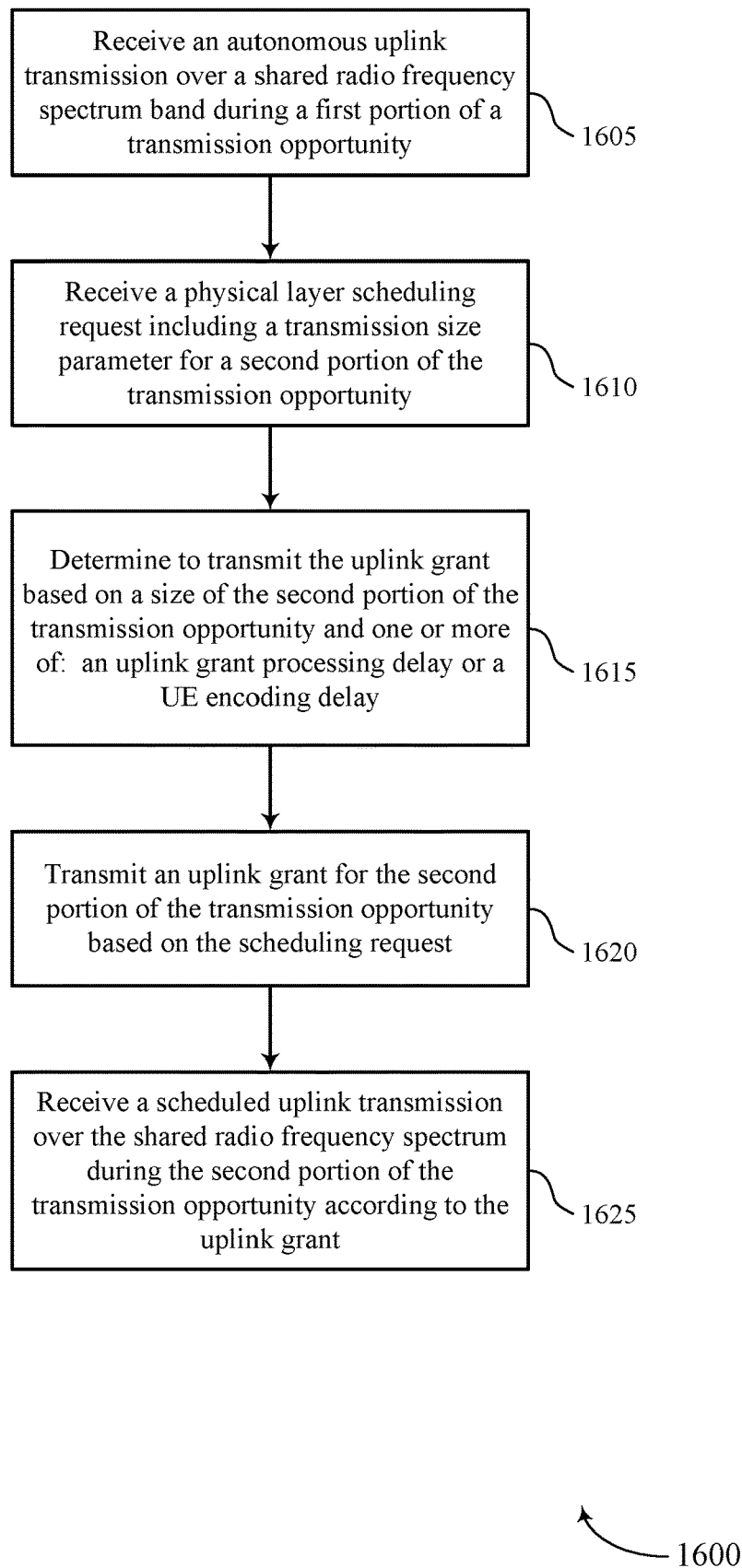

FIG. 16 shows a flowchart illustrating a method 1600 for transmission opportunity sharing for AUL in accordance with aspects of the present disclosure. The operations of method 1600 may be implemented by a base station 105 or its components as described herein. For example, the operations of method 1600 may be performed by a base station communications manager as described with reference to FIGS. 9 through 12. In some examples, a base station 105 may execute a set of codes to control the functional elements of the device to perform the functions described below. Additionally or alternatively, the base station 105 may perform aspects of the functions described below using special-purpose hardware.

At 1605, the base station 105 may receive an autonomous uplink transmission over a shared radio frequency spectrum band during a first portion of a transmission opportunity. The operations of 1605 may be performed according to the methods described herein. In certain examples, aspects of the operations of 1605 may be performed by a AUL manager as described with reference to FIGS. 9 through 12.

At 1610, the base station 105 may receive a physical layer scheduling request including a transmission size parameter for a second portion of the transmission opportunity. The operations of 1610 may be performed according to the methods described herein. In certain examples, aspects of the operations of 1610 may be performed by a AUL manager as described with reference to FIGS. 9 through 12.

At 1615, the base station 105 may determine to transmit the uplink grant based at least in part on a size of the second portion of the transmission opportunity and one or more of: an uplink grant processing delay or a UE encoding delay. The operations of 1615 may be performed according to the methods described herein. In certain examples, aspects of the operations of 1615 may be performed by a SR manager as described with reference to FIGS. 9 through 12.

At 1620, the base station 105 may transmit an uplink grant for the second portion of the transmission opportunity based at least in part on the scheduling request. The operations of 1620 may be performed according to the methods described herein. In certain examples, aspects of the operations of 1620 may be performed by a SUL manager as described with reference to FIGS. 9 through 12.

At 1625, the base station 105 may receive a scheduled uplink transmission over the shared radio frequency spectrum during the second portion of the transmission opportunity according to the uplink grant. The operations of 1625 may be performed according to the methods described herein. In certain examples, aspects of the operations of 1625 may be performed by a SUL manager as described with reference to FIGS. 9 through 12.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS).

LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications, comprising:
obtaining access to a shared radio frequency spectrum band for a transmission opportunity;
performing an autonomous uplink transmission over the shared radio frequency spectrum band during a first portion of the transmission opportunity;
transmitting a physical layer scheduling request comprising a transmission size parameter for a second portion of the transmission opportunity;
receiving an uplink grant for the second portion of the transmission opportunity based at least in part on the scheduling request; and
performing a scheduled uplink transmission over the shared radio frequency spectrum band during the second portion of the transmission opportunity according to the uplink grant.

2. The method of claim 1, further comprising:
selecting the transmission size parameter based at least in part on one or more of a buffer size, or a resource block count for the scheduled uplink transmission, or a modulation and coding scheme (MCS) for the scheduled uplink transmission.

3. The method of claim 1, further comprising:
determining to transmit the scheduling request based at least in part on a size of the second portion of the transmission opportunity and one or more of a scheduling request processing delay, or a UE encoding delay, or an uplink grant transmission time.

4. The method of claim 1, further comprising:
determining that a data buffer cannot be emptied using the autonomous uplink transmission during the first portion of the transmission opportunity; and
transmitting the scheduling request is based at least in part on the determining.

5. The method of claim 1, further comprising:
selecting an ending symbol for the autonomous uplink transmission based at least in part on the scheduling request.

6. The method of claim 5, further comprising:
determining that no scheduling request is to be transmitted during the transmission opportunity; and
selecting a last available symbol as the ending symbol based at least in part on the determining.

7. The method of claim 5, further comprising:
determining that the scheduling request is to be transmitted during the transmission opportunity; and
selecting an intermediate available symbol as the ending symbol based at least in part on the determining.

8. The method of claim 5, further comprising:
transmitting an indication of ending symbol selection with the scheduling request.

9. The method of claim 5, further comprising:
selecting a transport block size for the autonomous uplink transmission based at least in part on a selected ending symbol of the autonomous uplink transmission.

10. The method of claim 1, further comprising:
identifying a first subframe of the transmission opportunity associated with an expected receipt of the uplink grant by the UE; and
selecting an ending symbol for a second subframe preceding the first subframe based at least in part on the identifying.

11. The method of claim 1, further comprising:
transmitting the scheduling request in a request-to-send (RTS) frame; and
receiving the uplink grant in a clear-to-send (CTS) frame.

12. The method of claim 11, wherein at least a portion of the autonomous uplink transmission comprises the RTS frame.

13. The method of claim 11, wherein the RTS frame is transmitted when channel access is obtained.

14. The method of claim 11, wherein the RTS frame comprises a floating RTS frame in that the RTS frame is not aligned with respect to a subframe boundary.

15. The method of claim 11, further comprising:
performing the scheduled uplink transmission during a data frame occurring after the CTS frame.

16. The method of claim 1, wherein the transmission opportunity comprises at least one of a maximum channel occupancy time or a Wi-Fi TXOP.

17. The method of claim 1, wherein the transmission size parameter comprises a short buffer status report.

18. A method for wireless communications, comprising:
receiving an autonomous uplink transmission over a shared radio frequency spectrum band during a first portion of a transmission opportunity;
receiving a physical layer scheduling request comprising a transmission size parameter for a second portion of the transmission opportunity;
transmitting an uplink grant for the second portion of the transmission opportunity based at least in part on the scheduling request; and
receiving a scheduled uplink transmission over the shared radio frequency spectrum during the second portion of the transmission opportunity according to the uplink grant.

19. The method of claim 18, further comprising:
identifying a communication parameter associated with the scheduled uplink transmission; and
determining a time duration for the second portion of the transmission opportunity based at least in part on the transmission size parameter and the communication parameter.

20. The method of claim 19, wherein the communication parameter comprise one or more of a modulation and coding scheme parameter, or a transport block size parameter, or a channel performance parameter, or a combination thereof.

21. The method of claim 18, further comprising:
determining to transmit the uplink grant based at least in part on a size of the second portion of the transmission opportunity and one or more of: an uplink grant processing delay or a UE encoding delay.

22. The method of claim 18, further comprising:
receiving a signal indicating an ending symbol selection for the autonomous uplink transmission, the signal being received with the scheduling request.

23. The method of claim 18, further comprising:
receiving the scheduling request in a request-to-send (RTS) frame; and
transmitting the uplink grant in a clear-to-send (CTS) frame.

24. The method of claim 23, wherein at least a portion of the autonomous uplink transmission comprises the RTS frame.

25. The method of claim 23, wherein the RTS frame comprises a floating RTS frame in that the RTS frame is not aligned with respect to a subframe boundary.

26. The method of claim 23, further comprising:
receiving the scheduled uplink transmission during a data frame occurring after the CTS frame.

27. The method of claim 18, wherein the transmission opportunity comprises at least one of a maximum channel occupancy time transmission opportunity or a Wi-Fi transmission opportunity.

28. The method of claim 18, wherein the transmission size parameter comprises a short buffer status report.

29. An apparatus for wireless communications, comprising:
a processor;
memory in electronic communication with the processor; and
instructions stored in the memory, wherein the instructions are executable by the processor to:
obtain access to a shared radio frequency spectrum band for a transmission opportunity;
perform an autonomous uplink transmission over the shared radio frequency spectrum band during a first portion of the transmission opportunity;
transmit a physical layer scheduling request comprising a transmission size parameter for a second portion of the transmission opportunity;
receive an uplink grant for the second portion of the transmission opportunity based at least in part on the scheduling request; and
perform a scheduled uplink transmission over the shared radio frequency spectrum band during the second portion of the transmission opportunity according to the uplink grant.

30. An apparatus for wireless communications, comprising:
a processor;
memory in electronic communication with the processor; and
instructions stored in the memory, wherein the instructions are executable by the processor to:
receive an autonomous uplink transmission over a shared radio frequency spectrum band during a first portion of a transmission opportunity;
receive a physical layer scheduling request comprising a transmission size parameter for a second portion of the transmission opportunity;
transmit an uplink grant for the second portion of the transmission opportunity based at least in part on the scheduling request; and
receive a scheduled uplink transmission over the shared radio frequency spectrum during the second portion of the transmission opportunity according to the uplink grant.

* * * * *